(12) United States Patent
Park et al.

(10) Patent No.: US 12,092,379 B2
(45) Date of Patent: Sep. 17, 2024

(54) COMPRESSOR AND REFRIGERATION CYCLE DEVICE HAVING THE SAME

(71) Applicant: SAMSUNG ELECTRONICS CO., LTD., Suwon-si (KR)

(72) Inventors: Soodol Park, Suwon-si (KR); Sihyeon Ryu, Suwon-si (KR); Duhwa Jung, Suwon-si (KR); Taejun Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 342 days.

(21) Appl. No.: 17/519,024

(22) Filed: Nov. 4, 2021

(65) Prior Publication Data

US 2022/0146171 A1    May 12, 2022

Related U.S. Application Data

(63) Continuation of application No. PCT/KR2021/014631, filed on Oct. 19, 2021.

(30) Foreign Application Priority Data

Nov. 11, 2020    (KR) .................. 10-2020-0149855

(51) Int. Cl.
*F25B 41/20*    (2021.01)
*F04B 49/025*    (2006.01)
(Continued)

(52) U.S. Cl.
CPC ............ *F25B 41/20* (2021.01); *F04B 49/025* (2013.01); *F04B 49/035* (2013.01); *F04C 28/06* (2013.01);
(Continued)

(58) Field of Classification Search
CPC .. F25B 41/20; F25B 49/022; F25B 2600/026; F25B 2600/0261; F25B 2600/0262;
(Continued)

(56) References Cited

U.S. PATENT DOCUMENTS 2,043,058 A * 6/1936 Piceger ................. F25B 49/022
62/196.3
3,398,551 A * 8/1968 Yannascoli ............. F25B 41/20
417/299
(Continued)

FOREIGN PATENT DOCUMENTS

CN        110762009 A    2/2020
EP        2 447 483      7/2018
(Continued)

OTHER PUBLICATIONS

CN110762009A machine translation (Year: 2018).*
(Continued)

*Primary Examiner* — Christopher R Zerphey
(74) *Attorney, Agent, or Firm* — STAAS & HALSEY LLP

(57) ABSTRACT

A refrigeration cycle device includes a compressor. The compressor includes a casing, a driving unit disposed in the casing, a compression unit coupled to the driving unit and configured to compress a refrigerant, and a valve configured to control a flow of the refrigerant in the casing. The valve includes a valve chamber including a main flow path in which the refrigerant is to flow, the main flow path including a refrigerant inlet and a refrigerant outlet. The valve also includes a floating body disposed in the valve chamber to open or close the main flow path, and a bypass flow path formed in the valve chamber and which is to be opened or closed by the floating body. When the driving unit is stopped
(Continued)

and the bypass flow path is opened by the floating body, the refrigerant is to be detoured to the bypass flow path.

15 Claims, 18 Drawing Sheets

(51) Int. Cl.
    *F04B 49/035*     (2006.01)
    *F04C 28/06*     (2006.01)
    *F04C 28/26*     (2006.01)
    *F04C 28/28*     (2006.01)
    *F25B 1/04*     (2006.01)
    *F25B 31/02*     (2006.01)
    *F25B 41/40*     (2021.01)
    *F25B 49/02*     (2006.01)

(52) U.S. Cl.
    CPC ............... *F04C 28/26* (2013.01); *F25B 1/04* (2013.01); *F25B 41/40* (2021.01); *F25B 49/022* (2013.01); *F25B 31/026* (2013.01); *F25B 2500/07* (2013.01); *F25B 2500/26* (2013.01); *F25B 2600/026* (2013.01); *F25B 2600/0262* (2013.01)

(58) Field of Classification Search
    CPC ...... F04B 49/035; F04B 49/24; F04B 49/025; F04C 28/26
    See application file for complete search history.

(56) References Cited

U.S. PATENT DOCUMENTS

| | | | | |
|---|---|---|---|---|
| 5,640,854 A * | 6/1997 | Fogt | ..................... | F25B 31/008 62/505 |
| 6,863,510 B2 * | 3/2005 | Cho | ..................... | F04C 28/28 417/410.5 |
| 7,094,038 B2 * | 8/2006 | Choi | ..................... | F04C 28/26 417/410.5 |
| 9,145,891 B2 * | 9/2015 | Kim | ..................... | F16K 17/04 |
| 9,541,084 B2 * | 1/2017 | Ignatiev | ................. | F04C 28/18 |
| 10,309,700 B2 | 6/2019 | Lee et al. | | |
| 10,451,064 B2 | 10/2019 | Park et al. | | |
| 11,346,344 B2 | 5/2022 | Noh et al. | | |
| 2013/0306176 A1 | 11/2013 | Harada et al. | | |
| 2021/0164712 A1 | 6/2021 | Gao | | |

FOREIGN PATENT DOCUMENTS

| | | |
|---|---|---|
| GB | 1142605 | 2/1969 |
| JP | 2001-165073 A | 6/2001 |
| JP | 2010-65586 | 3/2010 |
| JP | 4516123 | 5/2010 |
| JP | 2018-53746 | 4/2018 |
| KR | 1985-0000036 Y1 | 2/1985 |
| KR | 10-2005-0102528 A | 10/2005 |
| KR | 10-0620042 | 9/2006 |
| KR | 10-1233727 B1 | 2/2013 |
| KR | 10-2016-0071721 A | 6/2016 |
| KR | 10-2017-0019098 | 2/2017 |
| KR | 10-2017-0038392 A | 4/2017 |
| KR | 10-1850422 B1 | 4/2018 |
| KR | 10-2020-0102834 | 9/2020 |

OTHER PUBLICATIONS

International Search Report for International Application No. PCT/KR2021/014631 dated Feb. 16, 2022.
Extended European Search Report dated Jan. 15, 2024 for European Application No. 21892175.7.

* cited by examiner

150: 151, 152, 153, 154

160: 171b, 154b, 162

COMPRESSOR AND REFRIGERATION CYCLE DEVICE HAVING THE SAME

CROSS REFERENCE TO RELATED APPLICATIONS

This application is a continuation application under 35 U.S.C. § 111(a) of International Application No. PCT/KR2021/014631, filed on Oct. 19, 2021, which claims priority to Korean Patent Application No. 10-2020-0149855 filed on Nov. 11, 2020. The disclosures of International Application No. PCT/KR2021/014631 and Korean Patent Application No. 10-2020-0149855 are incorporated by reference herein in their entirety.

BACKGROUND

1. Field

The disclosure relates to a compressor, and for example, relates to a compressor having a structure which more easily blocks a backflow of a refrigerant and reaches a balanced pressure. The disclosure also relates to a refrigeration cycle device having the compressor.

2. Description of the Related Art

A compressor, which is one of the elements constituting a refrigeration cycle device, is a device for converting a low-temperature low-pressure refrigerant gas to a high-temperature high-pressure gas by using power of a rotation shaft received from an electric motor. In a structure where a driving unit and a compression unit are sealed in a casing, the compressor may be instantaneously stopped due to various causes such as external electric shocks, excessive refrigerant intake flow rates, abnormal behaviors of a valve, pressure pulsations in a cycle, etc.

In this case where the compressor operation is stopped, there may be a difference in pressure between an internal space of the compressor with relatively high pressure and a compression chamber with relatively low pressure because a discharge flow path to discharge the refrigerant gas of the compression chamber to the internal space of the compressor is blocked by a discharge valve.

When the pressure difference is not resolved, refrigerant backflow, oil leakage, and the like may occur. Furthermore, when re-operation of the compressor is attempted while the pressure in the internal space and the pressure in the compression chamber do not reach a pressure equilibrium (balanced pressure) after the compressor is stopped, the difference between the pressure in the internal space and the pressure in the compression chamber is greater than a pressure difference at which the compressor can be operated, and thus the re-operation of the compressor might fail. Besides, when the compressor is re-operated, a lot of time and energy may be consumed in order for the refrigeration cycle to return to a stable state. Hence, there may be a need for a device enabling evaporation pressure and condensing pressure to quickly reach a balanced pressure when the compressor is stopped.

SUMMARY

Additional aspects will be set forth in part in the description which follows and, in part, will be apparent from the description, or may be learned by practice of the example embodiments.

Aspects of the disclosure may be directed to a device for the compressor and for a refrigeration cycle device having the compressor, in which a pressure balance in the compressor may be obtained quickly to prevent refrigerant backflow and oil leaks and so that the compressor can be re-operated or restarted quickly.

In accordance with an aspect of the disclosure, a compressor may include a casing, a driving unit disposed in the casing, a compression unit coupled to the driving unit and configured to compress a refrigerant, and a valve configured to control a flow of the refrigerant in the casing. The valve may include a valve chamber including a main flow path, in which the refrigerant is to flow, the main flow path including a refrigerant inlet and a refrigerant outlet, a floating body disposed in the valve chamber to open or close the main flow path, and a bypass flow path formed in the valve chamber and to be opened or closed by the floating body. When the driving unit is stopped and the bypass flow path is opened by the floating body, the bypass flow path is to allow the refrigerant to be detoured to the bypass flow path.

When the driving unit is operated during operation of the compressor, the floating body may be configured to open the main flow path. When the driving unit (or compressor) is stopped, the floating body may be configured to close the main flow path and open the bypass flow path.

The bypass flow path may include a bypass inlet and a bypass outlet. When the driving unit is operated during operation of the compressor, the floating body may be configured to close at least one of the bypass inlet and the bypass outlet. When the driving unit (or compressor) is stopped, the floating body may be configured to close at least one of the refrigerant inlet and the refrigerant outlet.

The valve may further include an elastic member configured to elastically pressurize the floating body such that the floating body closes the refrigerant inlet when the driving unit (or compressor) is stopped.

The compressor may further include a sealing member disposed between the valve chamber and the floating body to prevent the refrigerant from leaking into the bypass flow path during operation of the compressor (or driving unit).

The refrigerant inlet may be formed at a lower (bottom) portion of the valve chamber, and the refrigerant outlet may be formed at an upper (top) portion of the valve chamber. The elastic member may be disposed between the upper portion of the valve chamber and the floating body, and the bypass flow path may be disposed along a circumferential surface of the floating body.

The floating body may include a plurality of floating bodies, and the plurality of floating bodies may include a first floating body disposed in an upper portion of the valve chamber and a second floating body disposed below the first floating body.

The valve may further include a fixed body disposed in the valve chamber to allow the refrigerant to flow along the main flow path or the bypass flow path. The first floating body may be disposed above (on top of) the fixed body to open or close the main flow path, and the second floating body may be disposed in an internal space of the fixed body to open or close the bypass flow path.

The plurality of floating bodies may each include a hollow portion. The first floating body may include a first floating body hollow portion formed to be smaller than the refrigerant outlet of the valve chamber, and the second floating body may include a second floating body hollow portion formed to be smaller than an inlet of the fixed body.

The floating body may include a first floating body disposed on a first side of the valve chamber and a second floating body disposed on a second side of the valve chamber. The bypass flow path may be formed between the valve chamber and at least one of the first floating body and the second floating body, and the compressor may further include a sealing member disposed in an area where the bypass flow path is formed to prevent the refrigerant from leaking from the bypass flow path when the driving unit (or compressor) is stopped.

The compressor may include a compression chamber configured to compress the refrigerant, and a refrigerant suction tube configured to suck the refrigerant into the compression chamber. The valve may be disposed between an internal space of the casing and the refrigerant suction tube so that the bypass flow path discharges (or releases) the refrigerant from the internal space of the casing into the refrigerant suction tube.

The sealing member may include Teflon.

In accordance with an aspect of the disclosure, a refrigeration cycle device may include a condenser, an expander connected to the condenser, an evaporator connected to the expander, a compressor connected to the evaporator and configured to compress a refrigerant, and a valve disposed on at least one of an outside or an inside of the compressor and configured to control a flow of the refrigerant in the compressor. The valve may include a valve chamber including a refrigerant inlet and a refrigerant outlet, a floating body, disposed in the valve chamber, configured to control a flow of the refrigerant into the valve chamber and a flow of the refrigerant out of the valve chamber, and a bypass flow path formed in the valve chamber to be opened or closed based on a movement of the floating body. When the compressor is stopped and the bypass flow path is opened based on the movement of the floating body, the bypass flow path may allow the refrigerant to be detoured to the bypass flow path which includes a bypass inlet and a bypass outlet.

The floating body may be configured to close the bypass flow path when the compressor (or driving unit) is operated (during an operation of the compressor or driving unit), and may be configured to open the bypass flow path when the compressor (or driving unit) is stopped.

The valve may further include a main flow path formed in the valve chamber to allow the refrigerant to flow from the refrigerant inlet to the refrigerant outlet. The valve may further include an elastic member configured to elastically pressurize a main flow path formed in the valve chamber and the floating body, and the elastic member may be disposed between the valve chamber and the floating body so that the floating body closes the main flow path when the compressor (or driving unit) is stopped.

A connection pipe connecting the condenser to the compressor may be further included, and the valve may be installed at the connection pipe.

In accordance with an aspect of the disclosure, a refrigeration cycle device may include a condenser, an expander connected to the condenser, an evaporator connected to the expander, a compressor connected to the evaporator, and a valve arranged or disposed on at least one of an outside and an inside of the compressor. The valve may include a valve case, a floating body disposed in the valve case, a main flow path formed in the valve case and including a refrigerant inlet and a refrigerant outlet to allow a refrigerant to flow, and a bypass flow path including a bypass inlet and a bypass outlet for the refrigerant to be detoured to the bypass flow path when the main flow path is blocked or closed. The floating body may open the main flow path and block or close the bypass flow path during an operation of the compressor, and block or close the main flow path and open the bypass flow path when the compressor is stopped.

The bypass flow path may be formed between the valve case and the floating body.

The floating body may close or block at least one of the bypass inlet and the bypass outlet during an operation of the compressor or driving unit, and the floating body may close or block at least one of the refrigerant inlet or the refrigerant outlet when the compressor (or driving unit) is stopped.

An elastic member may be arranged or disposed between the valve case and the floating body and configured to elastically pressurize the floating body such that the floating body blocks or closes the refrigerant inlet when the compressor or driving unit is stopped.

The valve may further include a sealing member arranged or disposed between the valve case and the floating body to prevent the refrigerant from leaking into the bypass flow path during an operation of the compressor.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
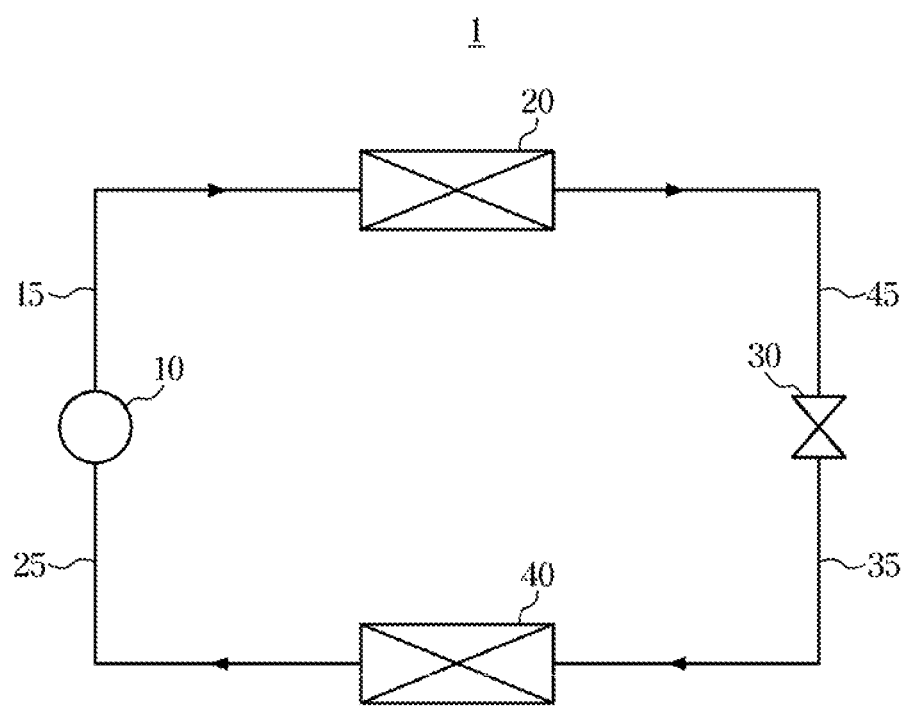
FIG. 1 illustrates a compressor and refrigeration cycle device including the same, according to an embodiment of the disclosure.

Embodiments and features as described and illustrated in the disclosure are merely examples, and there may be various modifications to replace the embodiments and drawings of the disclosure.

Throughout the drawings, like reference numerals refer to like parts or components.

The terminology used herein is for the purpose of describing example embodiments and is not intended to limit the disclosure. It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or room discussed below could be termed a second element, component, region, layer or section without departing from the teachings of the disclosure.

Descriptions shall be understood as to include any and all combinations of one or more of the associated listed items when the items are described by using the conjunctive term "and/or," or the like. That is, the term "and/or" includes a plurality of combinations of relevant items or any one item among a plurality of relevant items. For example, the scope of the expression or phrase "A and/or B" includes all of the following: (1) the item "A", (2) the item "B", and (3) the combination of items "A and B".

In addition, the scope of the expression or phrase "at least one of A and B" is intended to include all of the following: (1) at least one of A, (2) at least one of B, and (3) at least one A and at least one of B. Likewise, the scope of the expression or phrase "at least one of A, B, and C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

When it is stated in the disclosure that one element is "connected to" or "coupled to" another element, the expression encompasses an example of a direct connection or direct coupling, as well as a connection or coupling with another element interposed therebetween.

The terms "forward (or front)", "rearward (or rear)", "left", and "right" as herein used are defined with respect to the drawings, but the terms may not restrict the shape and position of the respective components.

Reference will now be made in detail to embodiments of the disclosure, which are illustrated in the accompanying drawings, wherein like reference numerals refer to the like elements throughout.

An aspect of the disclosure provides a compressor and refrigeration cycle device having the same, capable of efficiently removing a compression load in a compressor casing.

Another aspect of the disclosure provides a compressor and refrigeration cycle device having the same, capable of quickly reaching a pressure equilibrium in a compressor casing for re-operation from a stopped state.

Another aspect of the disclosure provides a compressor and refrigeration cycle device with reduced material costs and manufacturing costs.

According to the disclosure, a compressor and refrigeration cycle device including the same may be provided, which uses a simple structure to maintain a balanced pressure as soon as possible in a stopped state by removing a compression load in the compressor.

According to the disclosure, a compressor and refrigeration cycle device with reduced material cost and manufacturing cost may be provided.

FIG. 1 shows a refrigeration cycle device, according to an embodiment of the disclosure.

Referring to FIG. 1, a refrigeration cycle device 1 includes a compressor 10, a condenser 20, an expander 30, and an evaporator 40. The refrigeration cycle device 1 may allow a refrigerant to circulate a series of processes of compression, condensing, expansion, and evaporation, and make the refrigerant and an object to be cooled exchange heat with each other to cool the object.

The compressor 10 compresses a refrigerant gas into a high-temperature and high-pressure state and discharges the refrigerant gas, and the discharged refrigerant gas flows into the condenser 20. The condenser 20 condenses the compressed refrigerant into a liquid state, and radiates heat to the surroundings through the condensing process.

The expander 30 expands the high-temperature and high-pressure liquid refrigerant condensed by the condenser 20 to low-pressure liquid refrigerant. The evaporator 40 evaporates the refrigerant expanded by the expander 30. The evaporator 40 achieves a cooling effect by using latent heat of evaporation of the refrigerant to exchange heat with the object to be cooled, and then returns the low-temperature and low-pressure refrigerant gas to the compressor 10. With this cycle, a refrigeration cycle device for cooling the object to be cooled may be provided.

The compressor 10, the condenser 20, the expander 30, and the evaporator 40 are connected through pipes to enable the refrigerant to pass through. The refrigerant passing the compressor 10 is in a gaseous state, and the refrigerant passing the expander 30 is in a liquid state. The pipes connected to the compressor 10 are called gas-side pipes 15 and 25, and the pipes connected to the expander 30 are called liquid-side pipes 35 and 45.

The gas-side pipes 15 and 25 includes a first gas-side pipe 15 connecting the condenser 20 to the compressor 10 and a second gas-side pipe 25 connecting the evaporator 40 to the compressor 10. The first gas-side pipe 15 may be referred to as a connecting pipe 15. The liquid-side pipes 35 and 45 includes a first liquid-side pipe 45 connecting the condenser 20 to the expander 30 and a second liquid-side pipe 35 connecting the evaporator 40 to the condenser 30.

Figure 2:
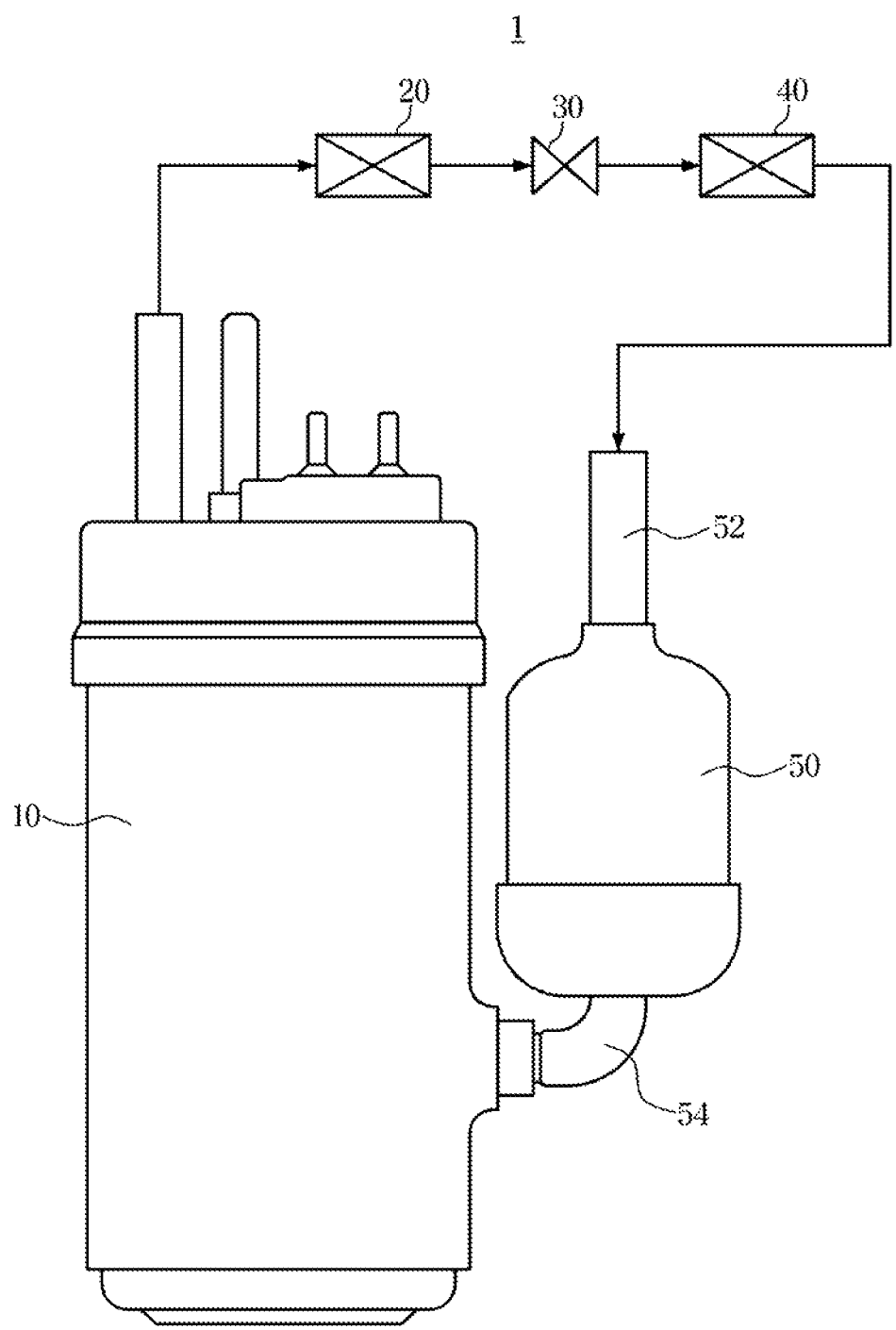
FIG. 2 illustrates the compressor of FIG. 1.
Figure 3:
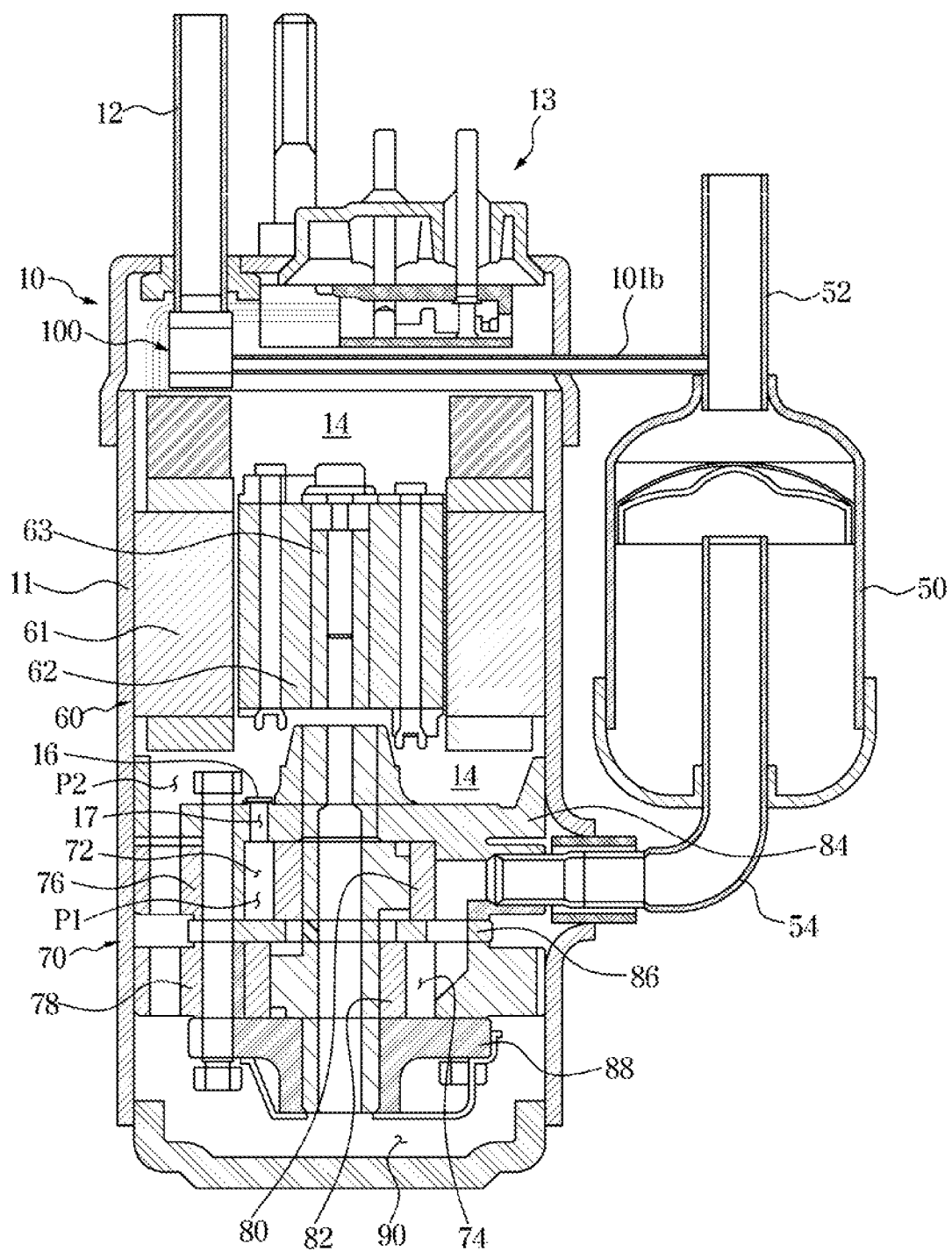
FIG. 3 is a cross-sectional view of the compressor of FIG. 1.

FIG. 2 illustrates a compressor, according to an embodiment of the disclosure, and FIG. 3 is a cross-sectional view of the compressor of FIG. 2.

Although the compressor will be described based on a rotary compressor for convenience of explanation in the specification, embodiments of the disclosure are not limited to the rotary compressor but may be applied to various other types of compressors.

Referring to FIGS. 2 to 3, the refrigerant discharged from the evaporator 40 may pass through an accumulator 50 and then flow into the compressor 10. The accumulator 50 may be arranged to adjoin the compressor 10, and the accumulator 50 and the compressor 10 may be connected through a suction tube 54. Furthermore, a discharge tube 12 discharging the compressed refrigerant and connected to the condenser 20 may be provided on one side of the compressor 10. The suction tube 54 may be a refrigerant suction tube 54 that sucks the refrigerant into a compression chamber 72 and 74.

The accumulator 50 may be installed to prevent some of the low-temperature and low-pressure refrigerant discharged from the evaporator 40, which do not reach to a gaseous state but remain in a liquid state, from flowing into the compressor 10. The refrigerant discharged from the evaporator 40 flows into the accumulator 50 through a connecting tube 52. As the compressor 10 has a difficulty in compressing the liquid refrigerant, the compressor 10 allows only the gas refrigerant to flow into the compressor 10 from the accumulator 50. That is, the liquid refrigerant is left in the accumulator and the gaseous refrigerant flows into the compressor 10.

The low-temperature and low-pressure refrigerant gas flowing into the compressor 10 may be compressed in the compressor 10 and then discharged into the connection pipe 15. The high-temperature and high-pressure refrigerant gas flowing out of the compressor 10 may flow into the condenser 20 through the connection pipe 15. The pressure of the refrigerant gas before compression is evaporation pressure, and the pressure of the compressed refrigerant gas flowing into the condenser 20 may be referred to as condensing pressure. The condensing pressure is higher than the evaporation pressure.

The compressor 10 includes a casing 11, a compression unit 70 and a driving unit 60 arranged in the casing 11. The driving unit 60 may be installed in an upper portion in the casing 11 and the compression unit 70 may be installed in a lower portion in the casing 11.

The driving unit 60 may include a cylindrical stator 61 fixed to the inner surface of the casing 11, and a rotator 62 rotationally installed within the stator 61. A rotation shaft 63 may be press-fitted and coupled to the center of the rotator. When power is applied, the rotator 62 and the rotation shaft 63 coupled to the rotator 62 are rotated, thereby driving the compression unit 70. In this case, the driving unit 60 may be operated at various speeds. In other words, the rotator 62 may be rotated at various speeds and the compression unit 70 may receive the rotation power accordingly.

The compression unit 70 may include cylinders 76 and 78 forming the compression chamber 72 and 74, and rolling pistons 80 and 82 that receive power from the driving unit 60 and encircle the compression chamber 72 and 74. The cylinders 76 and 78 may be provided in the plural, and accordingly, a plurality of compression chambers 72 and 74 separated from each other may be formed. In addition, the compression unit 70 may include a plurality of plates 84, 86, and 88 covering top and bottom of the plurality of cylinders 76 and 78 and thus forming the compression chambers 72 and 74 together.

The plurality of plates 84, 86, and 88 may include the first plate 84 arranged in an uppermost portion, the second plate 86 arranged under the first plate 84, and the third plate 88 arranged under the first plate 84 and the second plate 86. The second plate 86 may be arranged between the first plate 84 and the third plate 88.

In FIG. 3, shown are the first cylinder 76 and the second cylinder 78 positioned between the first cylinder 76 and the bottom of the casing 11. Accordingly, the first cylinder 76 may form the first compression chamber 72 and the second cylinder 78 may form the second compression chamber 74. The first and second rolling pistons 80 and 82 may be positioned in the first and second compression chambers 72 and 74, respectively. Furthermore, the plates 84, 86, and 88 may include the top plate 84 arranged above the first cylinder 76, the bottom plate 88 arranged under the second cylinder 78, and the middle plate 86 located between the first cylinder 76 and the second cylinder 78. However, the numbers and shapes of the plurality of cylinders 76 and 78, the plurality of compression chambers 72 and 74, the plurality of plates 84, 86, and 88 are not limited to what are shown in the drawings.

The rotation shaft 63 extending from the driving unit 60 may be installed by running or passing through the center of the first and second compression chambers 72 and 74. The rotation shaft 63 may be connected to the first and second rolling pistons 80 and 82 arranged in the first and second compression chambers 72 and 74.

The first and second rolling pistons 80 and 82 may be coupled to the rotation shaft 63, and may be rotated in the compression chambers 72 and 74 with eccentricity. With this structure, the first and second rolling pistons 80 and 82 may be eccentrically rotated in the compression chambers 72 and 74 and may compress a fluid to be compressed. Furthermore, the first and second rolling pistons 80 and 82 may be coupled together with eccentricities of different directions. For example, the first and second rolling pistons 80 and 82 may compress the refrigerant with a phase difference of 180 degrees.

The compressor 10 including such eccentrically rotating rolling pistons 80 and 82 is called a rotary compressor.

An oil storage space 90 may be provided on the bottom in the casing 11 for storing certain oil to be in contact with an end of the rotation axis 63. The oil moves up the rotation axis and flows back down, thereby reducing friction of the compression unit 70 or the like.

In order for the compressor 10 to operate, the difference between pressure P2 of the internal space 14 and pressure P1 of the compression chambers 72 and 74 should not be excessively large. In other words, when a difference in pressure P2-P1 between the compressor's internal space 14 and the compression chambers 72 and 74 is larger than a pressure difference P2'-P1' at which the compressor is able to operate, compression may not be performed. When a difference in pressure P2-P1 between the compressor's internal space 14 and the compression chambers 72 and 74 is larger than a pressure difference P2'-P1' at which the compressor is able to operate, the driving unit 60 may be overloaded because a discharge valve 16, which will be described later, is not opened. That is, when (P2-P1)>(P2'-P1'), the discharge valve 16 may not be opened and thus, the driving unit 60 may be overloaded.

The compressor 10 may include an anti-overload device 13 connected to the driving unit 60 for preventing a failure of the driving unit 60 from overload.

When the anti-overload device 13 operates, operation of the refrigeration cycle device 1 may be stopped. In other words, the anti-overload device 13 may stop the rotation shaft 63 of the compressor 10 and a motor (not shown) that operates the rotation shaft 63. The anti-overload device 13 may be arranged above the casing 11.

When the operation of the compressor 10 is stopped, for prompt re-operation of the compressor 10, the compression chambers 72 and 74 and the internal space 14 of the compressor need to be in quick pressure equilibrium. When the stopped state of the compressor 10 continues, problems such as oil leaks might occur. Accordingly, the compressor 10 needs to be quickly re-operated by making the compression chambers 72 and 74 with relatively low pressure and the internal space 14 with relatively high pressure reach a balanced pressure.

For example, the compressor 10 may include the discharge valve 16 and a discharge flow path 17 for discharging the refrigerant compressed by the compression chambers 72 and 74. The discharge valve 16 may be arranged on the top of the first plate 84. However, the position of the discharge valve 16 is not limited thereto.

When the driving unit 60 is operated, the rolling pistons 80 and 82 may compress the refrigerant gas in the compression chambers 72 and 74 while making a rotational movement. The discharge valve 16 is closed during operation of the compressor 10, and the pressure P2 of the internal space 14 may be higher than the pressure P1 in the compression chambers 72 and 74. When the refrigerant gas in the compression chambers 72 and 74 reaches a constant pressure (P1≈P2), the discharge valve 16 that has blocked the discharge flow path 17 may be opened. In this way, the refrigerant gas may be discharged into the internal space 14 of the compressor through the discharge flow path 17. In other words, the discharge valve 16 may open the discharge flow path 17 for the refrigerant gas of the compression chambers 72 and 74 to flow into the internal space 14.

On the contrary, when the driving unit 60 is abruptly stopped due to various causes, the discharge valve 16 may block the discharge flow path 17 to prevent backflow of the refrigerant gas. When the discharge flow path 17 is blocked, the internal space 14 and the compression chambers 72 and 74 that has been connected to each other are separated and thus, there may be a difference in pressure between the spaces. For example, the internal space 14 may have relatively high pressure, and the compression chambers 72 and 74 may have relatively low pressure.

As an example of the various causes, when the difference between the pressure P1 of the compression chamber and the pressure P2 of the internal space becomes excessively large, the driving unit 60 may be overloaded and the anti-overload device 13 may be operated. The anti-overload device 13 stops the driving unit 60 to remove a compression load in the compression unit 70. At this time, the discharge valve 16 may block the discharge flow path 17, and there may be a difference in pressure between the internal space 14 and the compression chambers 72 and 74.

In this case, when the compression load on the driving unit 60 is not quickly removed, it might be impossible to re-operate the compressor 10. For example, if the pressure P1 of the compression chamber and the pressure P2 of the internal space do not reach a required pressure equilibrium, the refrigeration cycle device 1 may not be re-operated.

However, when a time required for a pressure to be balanced becomes long, the compressor 10 and/or the refrigeration cycle device 1 including the same may encounter problems such as refrigerant backflow, oil leaks, a decrease in efficiency of the refrigeration cycle device, etc. Therefore, the time required until the balanced pressure is achieved should be reduced or shortened to avoid such problems as refrigerant backflow, oil leaks, a decrease in efficiency of the refrigeration cycle device, etc.

The refrigeration cycle device 1 may further include a valve 100 for quick arrival at the balanced pressure. The valve 100 may make the pressure P2 of the internal space 14, which is relatively high as compared to the pressure of the compression chambers 72 and 74 because the compressor 10 is stopped, closer to the pressure P1 of the compression chambers 72 and 74. The valve 100 may reduce the time required until the balanced pressure is obtained.

Specifically, as shown in FIG. 3, when the internal space 14 is in a high pressure state and the compression chambers 72 and 74 before compression of the refrigeration gas is in a low pressure state, the discharge valve 16 may be in a blocked state. Furthermore, the valve 100 may be connected to both the internal space 14 of the compressor and the external space of the compressor 10. The internal space 14 is a relatively high pressure space in which a compressed refrigerant gas is present, and the external space of the compressor 10 is a relatively low pressure space in which a refrigerant gas before compression is present. The valve 100 may connect the internal space 14 of the compressor on a high pressure side, to the external space of the compressor on a low pressure side. In this way, the refrigerant gas may be discharged from the internal space 14 to the external space of the compressor through the valve 100. The valve 100 and the external space may be connected through a bypass outlet tube 101b. The bypass outlet tube 101b may be connected to the connection tube 52. The refrigerant flowing to the connection tube 52 through the bypass outlet tube 101b may flow back to the compressor 10 through the accumulator 50.

Pressure of the external space of the compressor may be equal or similar to the pressure of the compression chambers 72 and 74 before compression of the refrigerant gas. That is, it may be a space with a lower pressure than in the internal space 14. For example, the external space of the compressor may be the connection tube 52. It is not, however, limited thereto, and the external space of the compressor may be a second gas-side pipe 25, the accumulator 50, or the suction tube 54. In other words, it is also possible that the bypass outlet tube 101b is connected to the second gas-side pipe 25, the accumulator 50, or the suction tube 54.

Although in FIG. 3 the valve 100 is shown as being connected to the external space through the bypass outlet tube 101b, it is not limited thereto, but the valve 100 may be directly connected to the external space depending on the position of the valve 100 or the valve 100 itself may be arranged outside the casing 11. Furthermore, a bypass inlet 161, which will be described later, may be connected to the internal space 14 directly or through an extra pipe, so that a high pressure refrigerant gas flows into the valve 100.

Moreover, the valve 100 may serve to prevent backflow of the refrigerant toward the internal space 14 from the outside of the compressor 10 when the compressor 10 is stopped. That is, it may prevent the refrigerant from flowing backward from the side of the condenser 20 to the side of the compressor 10. In an embodiment of the disclosure, the valve 100 may solely block the back-flowing refrigerant without an extra check valve and a solenoid valve and facilitate the pressure P1 of the compression chambers 72 and 74 and the pressure P2 of the internal space 14 to quickly reach a balanced pressure, thereby saving compressor manufacturing costs and material costs. Motion of the valve 100 will be described later in detail.

Although the valve 100 is shown in the casing 11 in FIG. 3, it is not limited thereto, and it may be arranged in various positions in which to facilitate quick arrival at the balanced pressure and prevent backflow of the refrigerant. For example, it is also possible to arrange the valve 100 on the outside of the casing 11. For example, the valve 100 may be arranged at the connection pipe 15.

Figure 4:
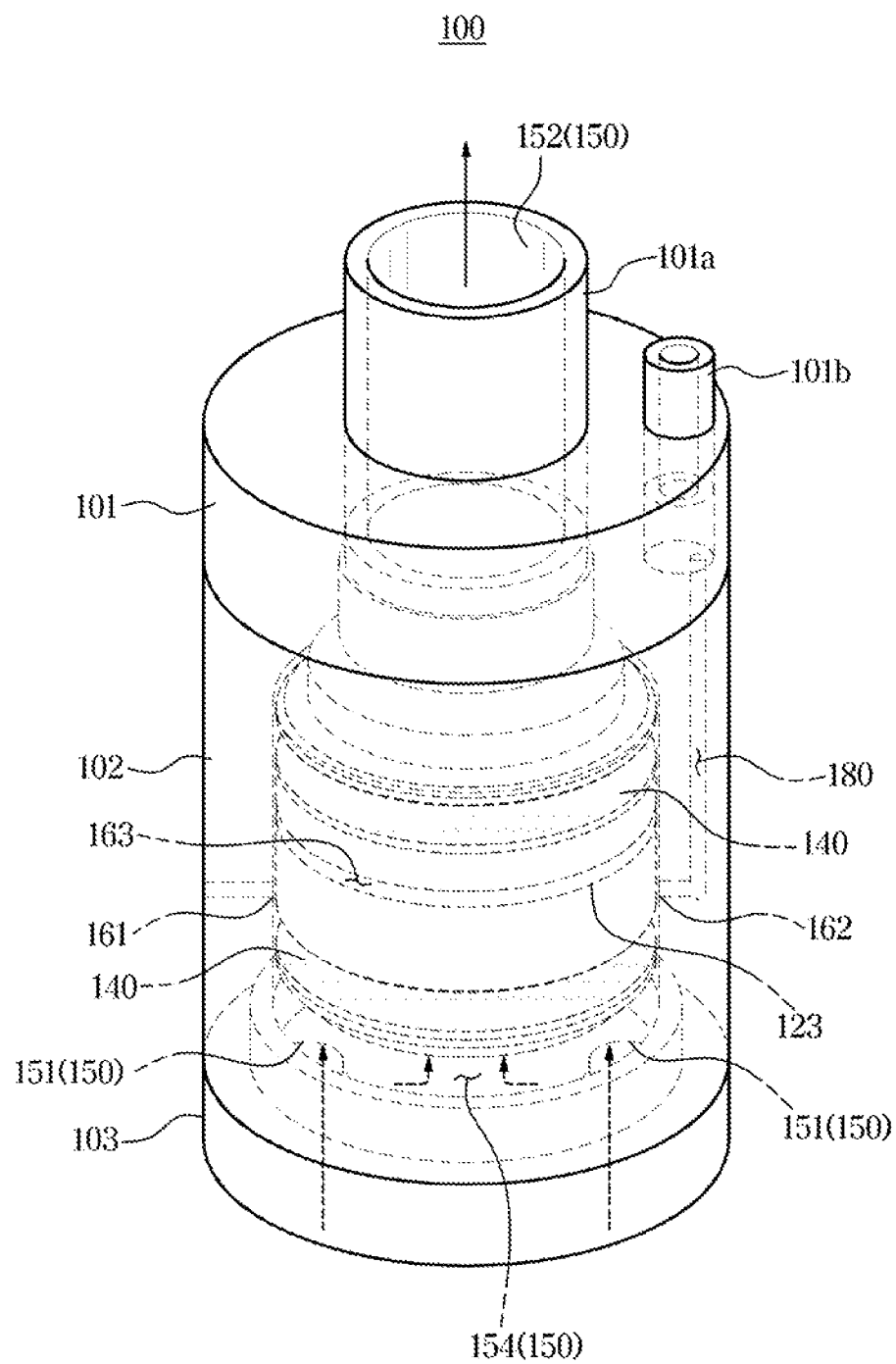
FIG. 4 illustrates a valve during operation of the compressor of FIG. 1.
Figure 5:
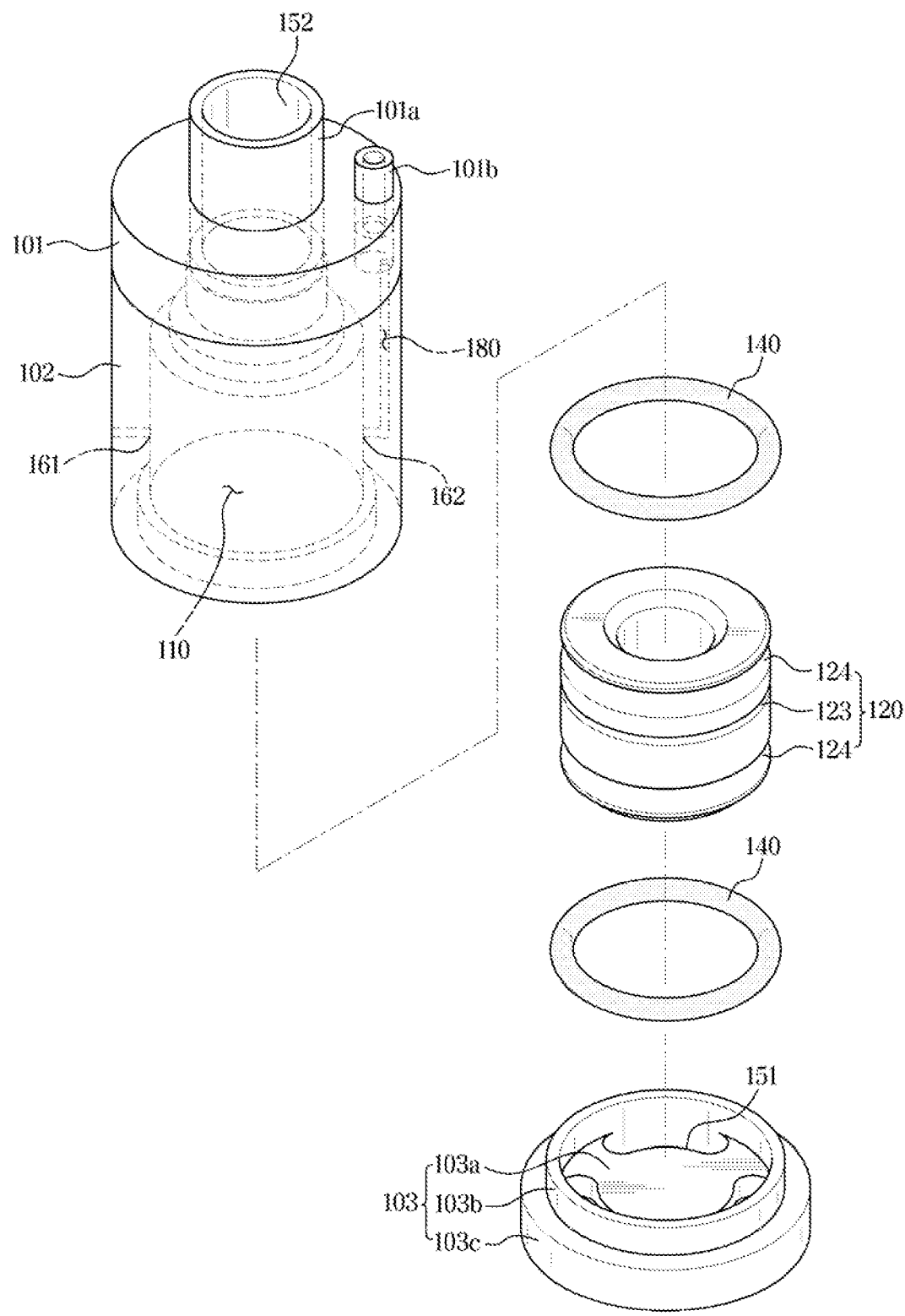
FIG. 5 is an exploded view of the valve of FIG. 4.
Figure 6:
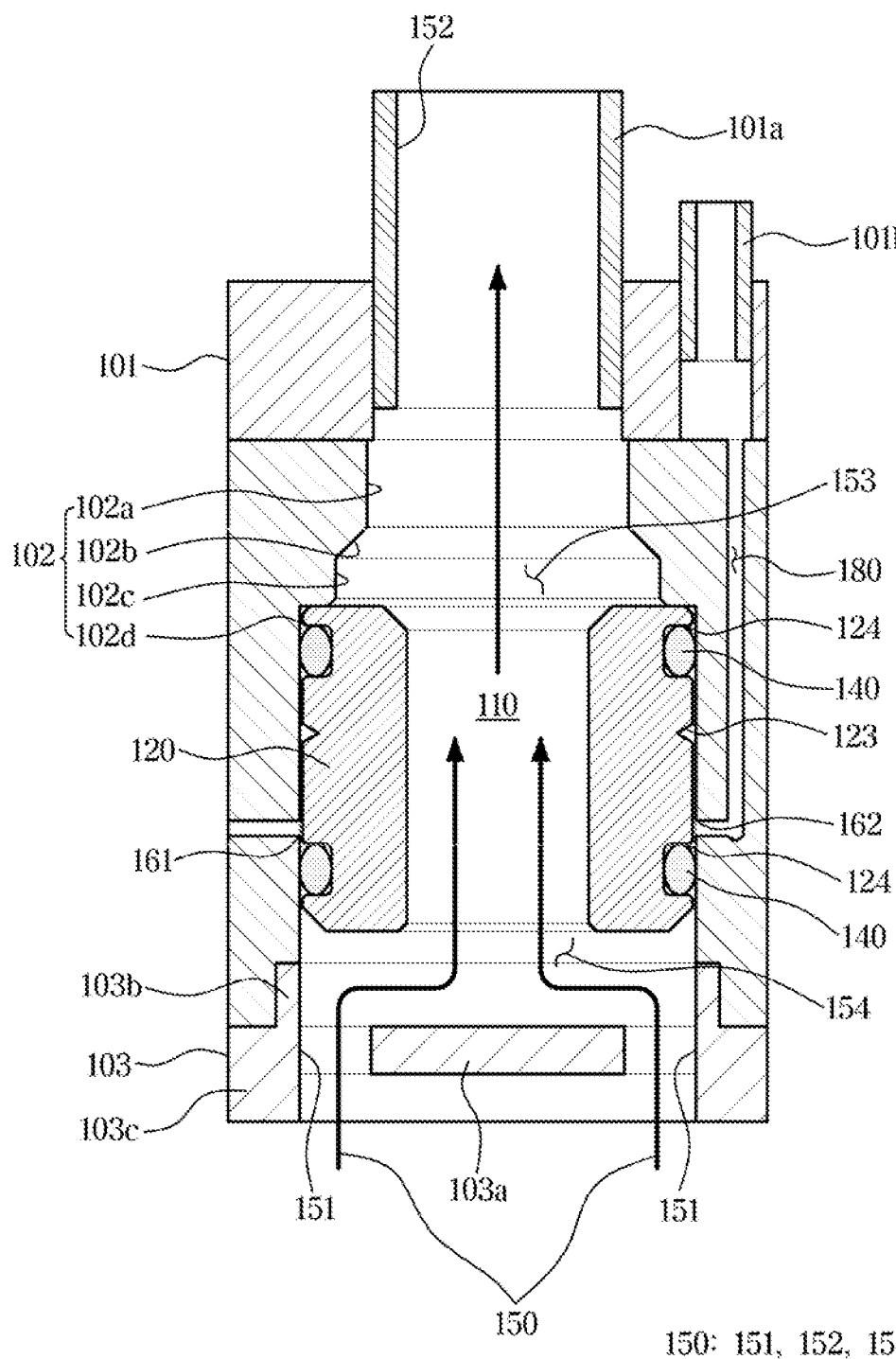
FIG. 6 is a cross-sectional view of a valve during operation of the compressor of FIG. 1.

FIG. 4 illustrates a valve during operation of the compressor 10 of FIG. 1. FIG. 5 is an exploded view of the valve of FIG. 4. FIG. 6 is a cross-sectional view of a valve during operation of the compressor 10 of FIG. 1.

Referring to FIGS. 4 to 6, the valve 100 may include a plurality of valve cases 101, 102 and 103 that constitute the exterior. The valve cases 101, 102 and 103 may include the first case 101, the second case 102, and the third case 103.

The first case 101 may be an upper case 101, the second case 102 may be a middle case 102, and the third case 103 may be a lower case 103. In other words, the first case 101 may form the external appearance of an upper portion of the valve 100, the second case 102 may form the external appearance of a middle portion of the valve 100, and the third case 103 may form the external appearance of a lower portion of the valve 100. Although the plurality of valve cases 101, 102 and 103 are separately formed in FIG. 4, they are not limited thereto and may be integrated into a single body.

The plurality of valve cases 101, 102 and 103 may have a cylindrical shape. However, the shape of the plurality of valve cases 101, 102 and 103 is not limited thereto and may have various forms.

The refrigerant outlet 152, the refrigerant outlet tube 101a, and the bypass outlet tube 101b may be formed at the first case 101. The refrigerant outlet tube 101a and the bypass outlet tube 101b may extend vertically. Furthermore, the refrigerant outlet tube 101a and the bypass outlet tube 101b may be formed in a cylindrical shape. It is not, however, limited thereto, and they may be formed in other various shapes that allow the refrigerant to flow. The refrigerant outlet 152 may allow the refrigerant gas to be discharged from the side of the internal space 14 to the side of the condenser 20.

The second case 102 may receive a sealing member 140 and a floating body 120. The second case 102 may be arranged between the first case 101 and the third case 103 in the vertical direction. It is not, however, limited thereto, and at least one of the first case 101 or the second case 103 may be omitted, or it may be arranged between the first case 101 and the second case 103 in the left-right direction.

The second case 102 may include multiple portions. The multiple portions may include a first portion 102a, a second portion 102b, a third portion 102c, and a fourth portion 102d. The first portion 102a may be a portion to be coupled to the first case 101. The second portion 102b may connect between the first portion 102a and the third portion 102c. The second portion 102b may be a slanting (slanted) portion 102b. The third portion 102c may connect between the second portion 102b and the fourth portion 102d. In the fourth portion 102d, the floating body 120, the sealing member 140, and an elastic member 130, which will be described later, may be arranged. The fourth portion 102d may have the largest area of the multiple portions.

The slanting portion 102b may be slanted upward toward the first case 101 to guide the refrigerant to flow from the refrigerant inlet 151 to the refrigerant outlet 152. In other words, the slanting portion 102b may have a smaller cross-sectional area toward the first portion 102a from the third portion 102c.

In the second case 102, a bypass inlet 161 and a connection flow path 180 may be formed.

The third case 103 may include a bottom wall 103a, an extension wall 103b, and a base 103c. The refrigerant inlet 151 may be formed at the bottom wall 103a. The refrigerant inlet 151 may be formed between the bottom wall 103a and the extension wall 103b. The refrigerant inlet 151 may be separated from each other and provided as a plurality of refrigerant inlets 151, for example, with the bottom wall 103a disposed between adjacent refrigerant inlets 151. It is not, however, limited thereto, and the plurality of refrigerant inlets 151 may be connected to form a single refrigerant inlet 151. The extension wall 103b may protrude upward from the base 103c. The base 103c may be arranged at the lowest portion of the third case 103. The base 103c may support the first case 101 and the second case 102. The refrigerant inlet 151 may allow the refrigerant gas to flow in from the internal space 14 or from the side of the accumulator 50.

The valve cases 101, 102 and 103 may form the valve chamber 110. A main flow path 150 may be formed in the valve chamber 110. However, the valve chamber 110 may be formed not only by the valve cases 101, 102 and 103 but also by components in the compressor 10. It is now assumed that there are the valve cases 101, 102 and 103, for convenience of explanation.

The valve 100 may include the main flow path 150 in which the refrigerant flows. The main flow path 150 may be formed inside the valve cases 101, 102 and 103. In other words, the main flow path 150 may be formed in the valve chamber 110. The main flow path 150 may include the refrigerant inlet 151 and the refrigerant outlet 152. During operation of the compressor 10, the refrigerant flowing in from the refrigerant inlet 151 may pass through the valve chamber 110 and flow out through the refrigerant outlet 152. In the valve 100, the refrigerant inlet 151 may be connected to the internal space 14 to discharge the refrigerant from the internal space 14 with high pressure to an external space of the compressor 10 with low pressure, and the refrigerant outlet 152 may be connected to the outside of the casing 11 through the refrigerant outlet tube 101a. Specifically, the refrigerant outlet 152 may be connected to the connection tube 52 or the suction tube 54. It is not, however, limited thereto, and the refrigerant outlet 152 may be connected to anywhere in a low pressure area or space.

The main flow path 150 may include a first main flow path 153 and a second main flow path 154. The first main flow path 153 may be formed in an area corresponding to the first portion 102a, the second portion 102b, and the third portion 102c. The second main flow path 154 may be formed in an area corresponding to the fourth portion 102d. The first main flow path 153 and the second main flow path 154 may be internal flow path 156 formed in the valve chamber 110.

The valve 100 may include the floating body 120 and the sealing member 140.

The floating body 120 may be arranged in the valve chamber 110. Specifically, the floating body 120 may be arranged in the second case 102. The floating body 120 may be arranged in the fourth portion 102d and may move up or down. As the refrigerant flows in a direction from the third case at which the refrigerant inlet 151 is formed to the first case 101 at which the refrigerant outlet 152 is formed during operation of the compressor 10, the floating body 120 may be arranged in an upper part of the fourth portion 102d. In this case, the floating body 120 may block the bypass flow path 160. Accordingly, the refrigerant gas flowing through the bypass flow path 160 may not be present.

The floating body 120 may include a bypass groove 123 and a sealing member groove 124.

The bypass groove 123 may be formed by being sunken or recessed along the circumferential surface of the floating body 120 to form the bypass flow path 160. However, the form of the bypass groove 123 is not limited thereto, and may have various forms. The bypass groove 123 may be formed between grooves 124 of the plurality of sealing members 140a, 140b and 140c. The position of the bypass groove 123 is not, however, limited thereto.

The sealing member grooves 124 may be formed by being sunken or recessed along the circumferential surface of the floating body 120 for the sealing member 140 to be inserted thereto. However, the form of the bypass groove 123 is not limited thereto, and may have various forms. The sealing member grooves 124 may be formed above and below the bypass groove 123. It is not, however, limited thereto, and may be formed only above or only below the bypass groove 123.

Although the floating body 120 is shown as having a cylindrical shape, it is not limited thereto and may have various shapes.

The sealing member 140 may prevent the refrigerant from flowing to the bypass flow path 160 during operation of the compressor 10. In other words, to prevent the refrigerant from leaking out into the bypass flow path 160 while the refrigerant flows in the main flow path 150, the sealing member 140 may be provided in the valve cases 101, 102 and 103. As the refrigerant does not leak out from the main flow path 150, the compression power may increase and an amount of the refrigerant flowing into the compressor casing 11 may be minimized.

The sealing member 140 may be provided as a plurality of sealing members 140. The sealing members 140 may be arranged to correspond to the positions of the sealing member grooves 124. Although the sealing members 140 are shown as being positioned above and below the bypass inlet 161 and the bypass outlet 162, they are not limited thereto and may be arranged in various positions in which to prevent the refrigerant from leaking out. The sealing member 140 may be formed of Teflon, for example.

The valve 100 may include the bypass flow path 160 to which the refrigerant is detoured or redirected. The bypass flow path 160 may be formed between the valve cases 101, 102 and 103 and the floating body 120. The bypass flow path 160 may be formed between the valve chamber 110 and the floating body 120.

The valve 100 may further include a connection flow path 180. Specifically, the bypass flow path 160 may include the connection flow path 180. The connection flow path 180 may be arranged between the bypass outlet 162 and the bypass outlet tube 101b. Specifically, in the bypass flow path 160, the connection flow path 180 may be arranged on a downstream side of the bypass outlet 162.

Referring to FIG. 6, a function of the valve 100 during operation of the compressor 10 will be described.

While the compressor 10 is operated, the refrigerant gas may be discharged from the compression chambers 72 and 74 into the internal space 14 through the discharge valve 16 and may then flow from the compressor 10 to the condenser 20. The valve 100 may be arranged between the compressor 10 and the condenser 20. Accordingly, the refrigerant may flow into the valve chamber 110 through the refrigerant inlet 151 of the valve 100 and may be discharged out of the valve 100 through the refrigerant outlet 152.

In this case, the refrigerant gas flowing past the valve chamber 110 to the condenser 20 may pressurize the floating body 120 upward so that the floating body 120 may be moved upward. The floating body 120 may come into contact with the top of the fourth portion 102d. As the floating body 120 is moved upward, it may force open the main flow path 150. Furthermore, when the floating body 120 is moved upward, the bypass inlet 161 and the bypass outlet 162 may not be connected to the bypass grooves 123. That is, the bypass flow path 160 may be blocked.

Figure 7:
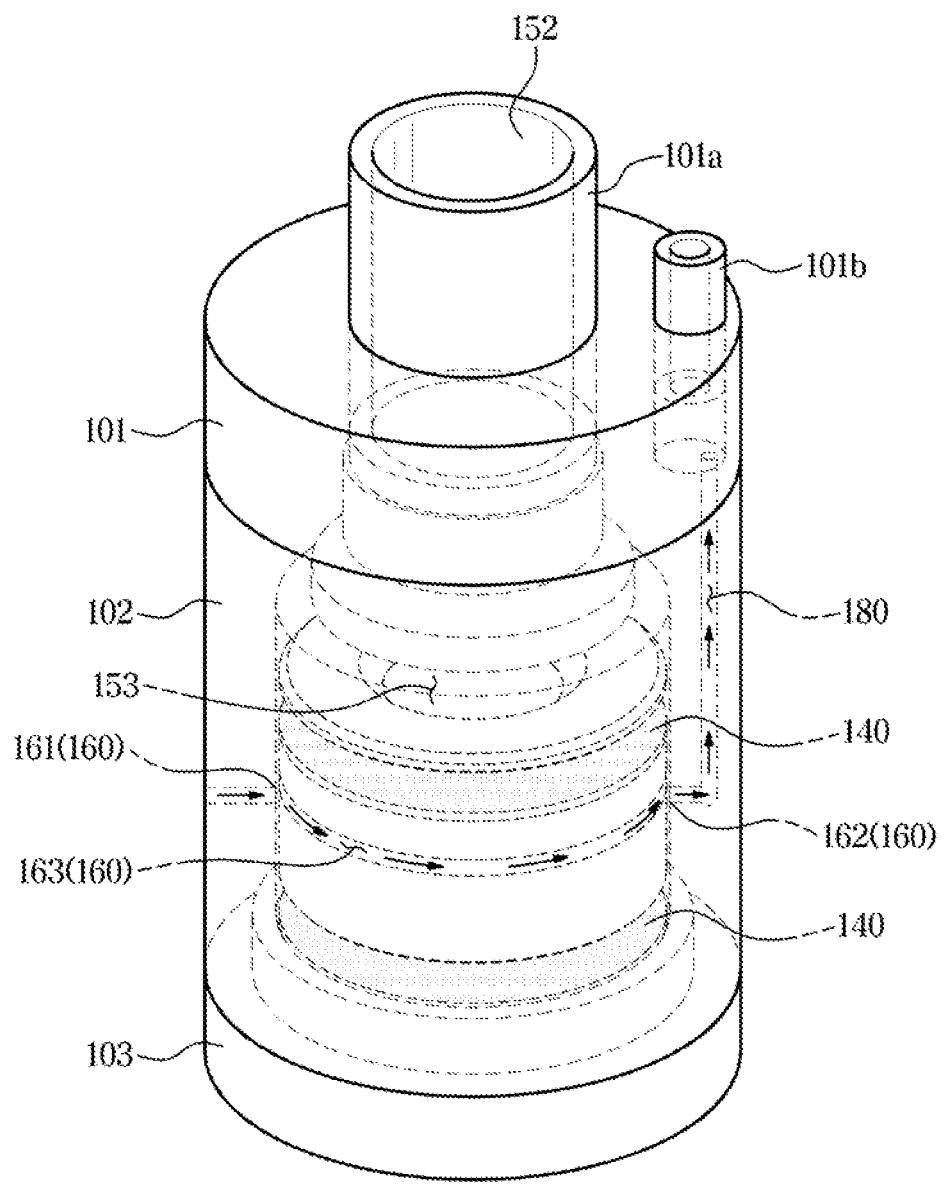
FIG. 7 illustrates a valve when the compressor of FIG. 1 is stopped.
Figure 8:
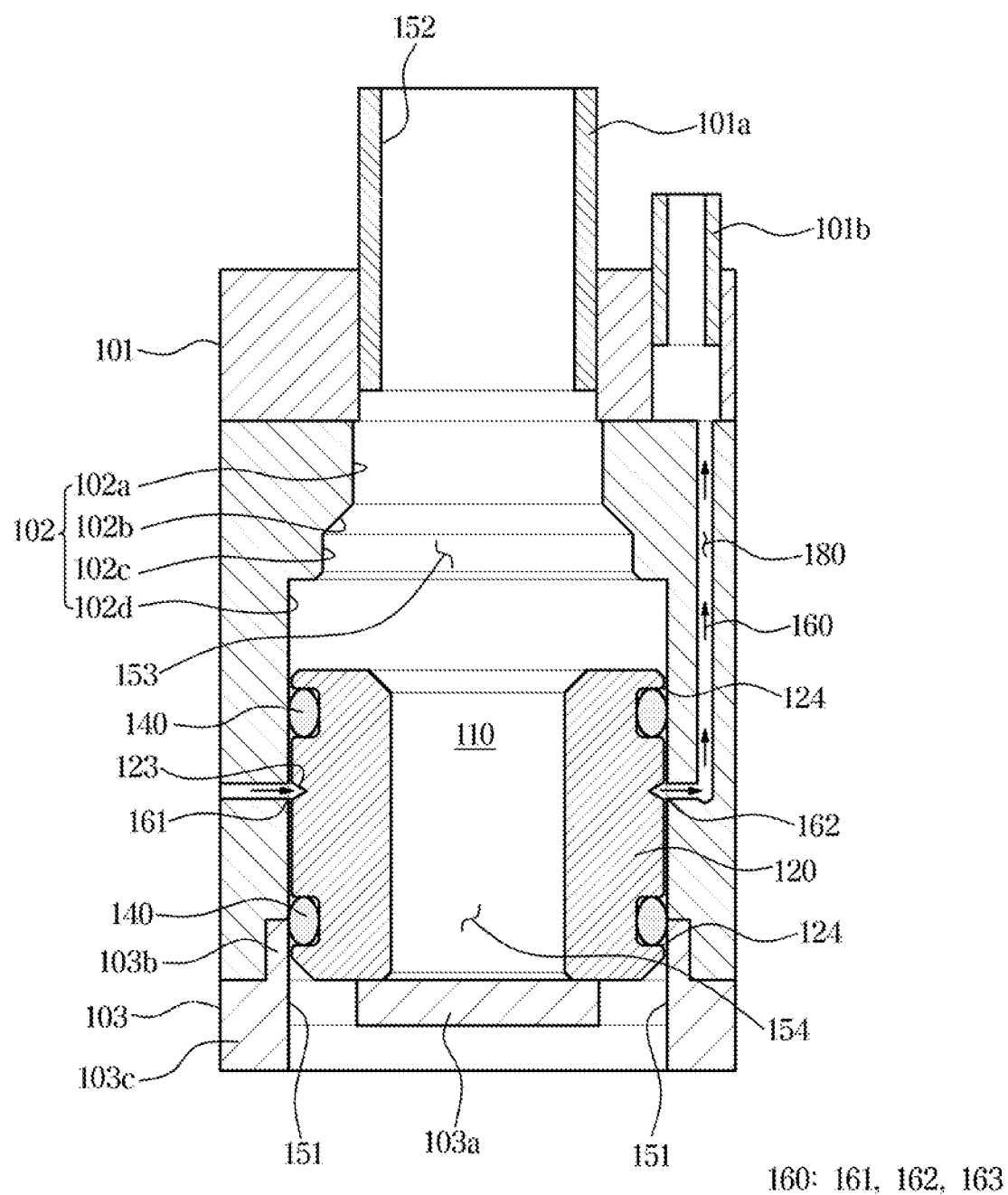
FIG. 8 is a cross-sectional view of a valve when the compressor of FIG. 1 is stopped.

FIG. 7 illustrates a valve when the compressor of FIG. 1 is stopped. FIG. 8 is a cross-sectional view of a valve when the compressor of FIG. 1 is stopped.

Referring to FIGS. 7 and 8, when the compressor 10 is stopped, the floating body 120 may be moved downward because the side of the condenser 20 has higher pressure than on the side of the compressor 10. Specifically, when the compressor 10 is stopped, compression of the refrigerant gas may be prevented, and the refrigerant gas may flow backward because the side of the condenser has higher pressure than on the side of the compressor 10. Accordingly, the refrigerant gas may pressurize the floating body 120 downward. Specifically, the floating body 120 may be moved down in the valve chamber 110 and may contact the bottom wall 103a. The floating body 120 may move down and block the refrigerant inlet 151. This is because the driving unit 60 and the compression unit 70 may be operated during operation of the compressor 10 so that the refrigerant gas flows to the condenser 20 on the high pressure side, but when the compressor 10 is stopped, the driving unit 60 and the compression unit 70 are stopped so the compressor 10 may not make the refrigerant flow to the condenser 20.

In other words, when the compressor 10 is stopped, the refrigerant may flow to the compressor 10 from the condenser 20 because the side of the condenser 20 has relatively higher pressure than on the side of the compressor 10 and there is no power to send it to the condenser 20 from the compressor 10. That is, the refrigerant may flow backward from the side of the condenser 20 with high pressure to the side of the compressor 10 with low pressure. The refrigerant may flow backward from the side of the refrigerant outlet 152 to the side of the refrigerant inlet 151.

Accordingly, the back-flowing refrigerant may pressurize the floating body 120 so that the floating body 120 is moved from the side of the condenser 20 to the side of (toward) the compressor 10. The floating body 120 pressurized by the back-flowing refrigerant may move to the side of the refrigerant inlet 151 and block the refrigerant inlet 151. For example, the floating body 120 may come into contact with the bottom wall 103a of the bottom case. Finally, when the compressor 10 is stopped, the floating body 120 may block the main flow path 150, thereby preventing the refrigerant from flowing backward into the compressor 10. The floating body 120 may be moved from an upper portion to a lower portion in the valve chamber 110.

As described above, when the compressor 10 is abruptly stopped, problems such as refrigerant backflow, oil leaks, a decrease in efficiency of the refrigeration cycle device, etc., may occur. Hence, the internal space 14 of the compressor and the compression chambers 72 and 74 quickly reach a pressure equilibrium so that the compressor 10 can be re-operated.

The floating body 120 may block the main flow path 150 and open the bypass flow path 160.

The bypass flow path 160 may include the bypass inlet 161, the bypass outlet 162, and a middle bypass flow path 163.

When the compressor 10 is stopped, the floating body 120 is moved downward to block the refrigerant inlet 151, so the floating body 120 may block the main flow path 150. Furthermore, as the bypass groove 123 is connected to the bypass inlet 161 and the bypass outlet 162, the middle bypass flow path 163 may be connected to the bypass inlet 161 and the bypass outlet 162. In other words, as the refrigerant flows backward, the floating body 120 may be moved down to open the bypass inlet 161 and the bypass outlet 162.

In this case, as the refrigerant pressure P2 of the internal space 14 of the compressor is higher than the refrigerant pressure P1 of the compression chamber, the discharge valve 16 may be in a closed state. Hence, in order for the internal space 14 of the compressor and the compression chambers 72 and 74 to reach the pressure equilibrium, the refrigerant gas of the internal space 14 with relatively high pressure may flow into the valve chamber 110 through the bypass inlet 161 and then flow to the bypass outlet 162 through the middle bypass flow path 163. The refrigerant flowing out from the bypass outlet 162 may flow out to an external space of the compressor with relatively low pressure from the bypass outlet tube 101b through the connection flow path 180.

The pressure of the external space of the compressor may be equal or similar to the pressure of the compression chambers 72 and 74 before compression of the refrigerant gas. That is, it may be a space with a lower pressure than in the internal space 14. For example, the external space of the compressor may be the connection tube 52. It is not, however, limited thereto, and the external space of the compressor may be the second gas-side pipe 25, the accumulator 50, or the suction tube 54. In other words, it is also possible that the bypass outlet 162 is connected to the second gas-side pipe 25, the accumulator 50, or the suction tube 54.

However, the connection flow path 180 may be omitted. For example, the refrigerant gas may sequentially pass the bypass inlet 161, the middle bypass flow path 163, and the bypass outlet 162 and may be discharged directly to the outside without the connection flow path 180.

The bypass inlet 161 may be connected to the internal space 14 of the casing 11. Specifically, the bypass inlet 161 may be connected to the internal space 14 to make the high pressure of the internal space 14 reach a balanced pressure. However, it is not necessary for the valve 100 to be arranged in the casing 11, and even when the valve 100 is arranged on the outside, it may be connected through an extra pipe (not shown) for connecting between the internal space 14 and the bypass inlet 161.

The valve 100 may be arranged in various positions without positional limitations, thereby increasing space utilization of the compressor 10 and the refrigeration cycle device.

The bypass inlet 161 may be connected to the internal space 14 with relatively high pressure, and the bypass outlet 162 may be connected to the external space of the compressor 10 with relatively low pressure.

In other words, when the main flow path 160 is blocked due to movement of the floating body 120, the refrigerant in the internal space 14 may flow into the valve chamber 110 through the bypass inlet 161. The refrigerant in the valve chamber 110 may be linked to an external space through the bypass outlet 162 and the bypass outlet tube 101b. In other words, the refrigerant may flow to the connection tube 52 through the bypass outlet 162 and the bypass outlet tube 101b (see FIG. 3). Accordingly, the refrigerant that has flowed to the connection tube 52 may flow back to the accumulator 50. Among the refrigerant passing the accumulator 50, some refrigerant in a liquid state may stay in the accumulator 50 and only gaseous refrigerant may flow back into the compressor 10. The accumulator 50 may be arranged to adjoin the compressor 10, and the accumulator 50 and the compressor 10 may be connected through the suction tube 54. Accordingly, the refrigerant gas may flow back into the compressor 10 through the suction tube 54. The suction tube 54 may be connected to the compression chambers 72 and 74 to suck in the refrigerant.

For example, when the main flow path 150 is blocked and the bypass flow path 160 is opened, the internal space 14 and the compression chambers 72 and 74 may be connected through the bypass flow path 160, the connection tube 52, the accumulator 50 and the suction tube 54 even though the discharge valve 16 has blocked the discharge flow path 17.

Accordingly, the refrigerant that has been in the internal space 14 flows into the connection tube 52 and may pass through the accumulator 50 again and flow to the suction tube 54. The refrigerant gas that has flowed to the suction tube 54 flows to the compression chambers 72 and 74, so the internal space 14 and the compression chambers 72 and 74 may reach a balanced pressure without opening the discharge valve 16. In other words, the pressure P2 of the internal space 14 may be forced to be dropped down to be close to the pressure P1 of the compression chambers 72 and 74.

In the above process, a difference in pressure P2-P1 between the compression chambers 72 and 74 of the compressor and the internal space 14 may be smaller than pressure P2'-P1' at which operation is possible. That is, (P2'-P1')>(P2-P1). As a result, the compressor 10 may be re-operated.

The balanced pressure may be close to the pressure P1 of the compression chambers 72 and 74. The level of the balanced pressure is not, however, limited thereto.

In this way, the valve 100 according to an embodiment of the disclosure may make the pressure of the internal space 14 of the compressor reach a balanced pressure with the pressure of the compression chambers 72 and 74 and the accumulator 50 without an extra check valve and solenoid valve, so that the compressor may be re-operated as soon as possible. Accordingly, production costs and material costs for the refrigeration cycle device may be saved.

Once again, the compressor may be abruptly stopped due to various causes such as external electric shocks, excessive internal refrigerant intake flow rates, pressure pulsations in the cycle, etc. For example, when the pressure difference P2-P1 is greater than a pressure difference P2'-P1' at which the cycle allows operation of the compressor, because the compressor pressure P1 is too low or the pressure P2 of the internal space is too high, the discharge valve 16 may not open the discharge flow path 17 and instead the anti-overload device 13 may be operated to stop the driving unit 60.

As the compressor 10 is stopped, the refrigerant may flow backward into the compressor 10 from the condenser 20, in which case the floating body 120 of the valve 100 may be moved downward due to the pressure from the refrigerant backflow, blocking the refrigerant inlet 151 and thus preventing the backflow of the refrigerant.

In this case, the floating body 120 may open the bypass flow path 160. The bypass inlet 161 may be connected to the internal space 14 of the compressor directly or through an extra pipe (not shown). The bypass outlet 162 may be connected to the external space of the compressor directly or through the connection flow path 180 and the bypass outlet tube 101b.

The pressure of the external space of the compressor may be equal or similar to the pressure of the compression chambers 72 and 74 before compression of the refrigerant gas. That is, it may be a space with a lower pressure than in the internal space 14. For example, the external space of the compressor may be the connection tube 52. It is not, however, limited thereto, and the external space of the compressor may be the second gas-side pipe 25, the accumulator 50, or the suction tube 54. In other words, it is also possible that the bypass outlet 162 is connected to the second gas-side pipe 25, the accumulator 50, or the suction tube 54.

Accordingly, due to the pressure difference, the refrigerant gas may flow from the internal space 14 on a relatively high-pressure side to the external space on a relatively low-pressure side. This may make the pressure P2 of the internal space and the pressure P1 of the compression chamber reach a balanced pressure within a short time, and the difference in pressure P2-P1 between the internal space and the compression chamber becomes smaller than the pressure difference P2'-P1' at which the compressor may be operated, thereby re-operating the compressor 10 and the refrigeration cycle device 1.

Figure 9:
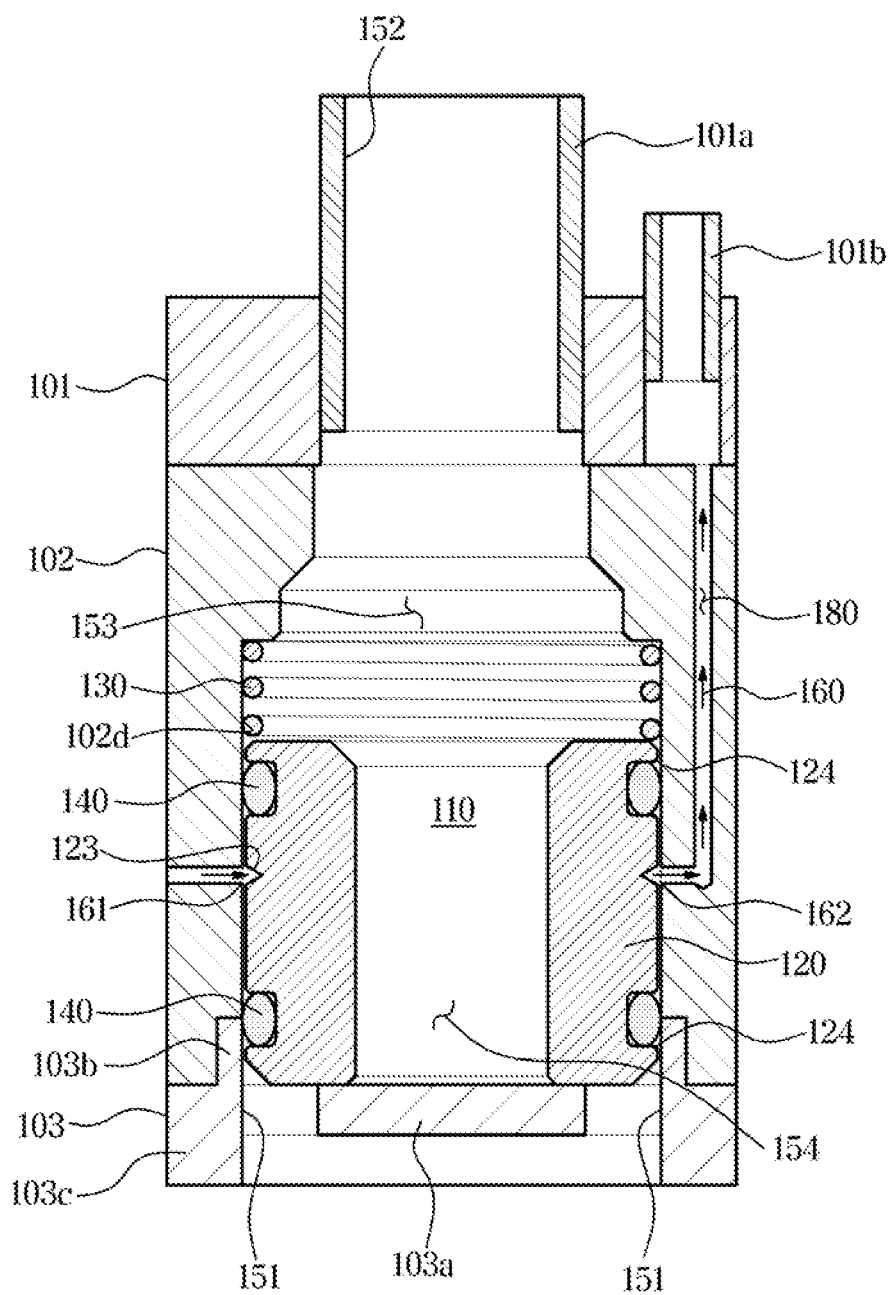
FIG. 9 is a cross-sectional view of a valve when a compressor is stopped, according to an embodiment of the disclosure.

FIG. 9 is a cross-sectional view of a valve when a compressor is stopped, according to an embodiment of the disclosure.

The same features as in the aforementioned embodiment are denoted by the same reference numerals, and the overlapping description will not be repeated.

Referring to FIG. 9, the valve 100 may further include an elastic member 130. The elastic member 130 may pressurize the floating body 120 so that the floating body 120 is able to quickly block the refrigerant inlet 151 when the compressor 10 is stopped. In other words, the elastic member 130 may allow the main flow path 150 to be quickly blocked and the bypass flow path 160 to be opened.

The elastic member 130 may be arranged between the refrigerant outlet 152 and the floating body 120. For example, it may be arranged in the fourth portion 102d of the second case 102. The position of the elastic member 130 is not, however, limited thereto, and the elastic member 130 may be arranged in various positions in which the floating body 120 is able to quickly block the refrigerant inlet 151 when the compressor 10 is stopped.

Figure 10:
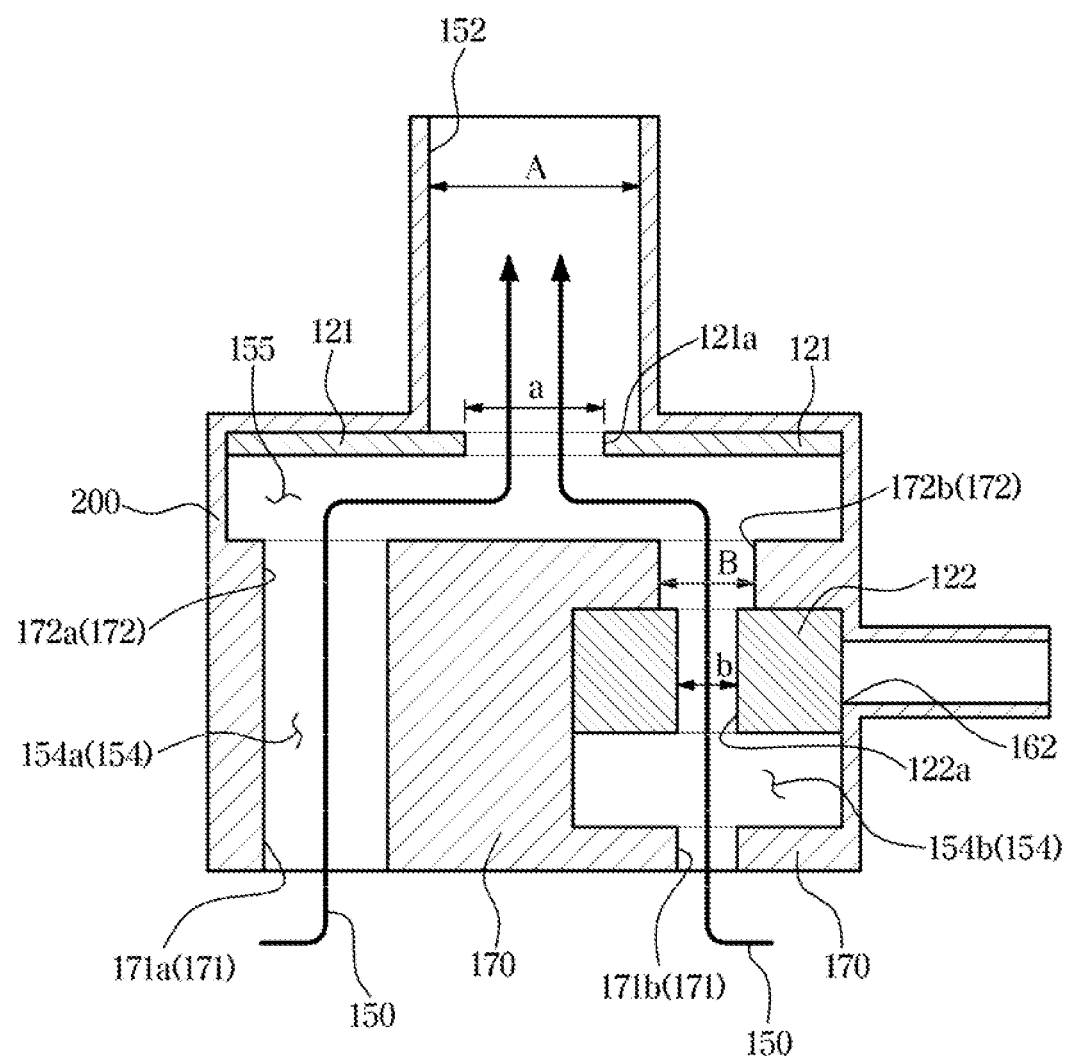
FIG. 10 is a schematic cross-sectional view of a valve during operation of a compressor, according to an embodiment of the disclosure.
Figure 11:
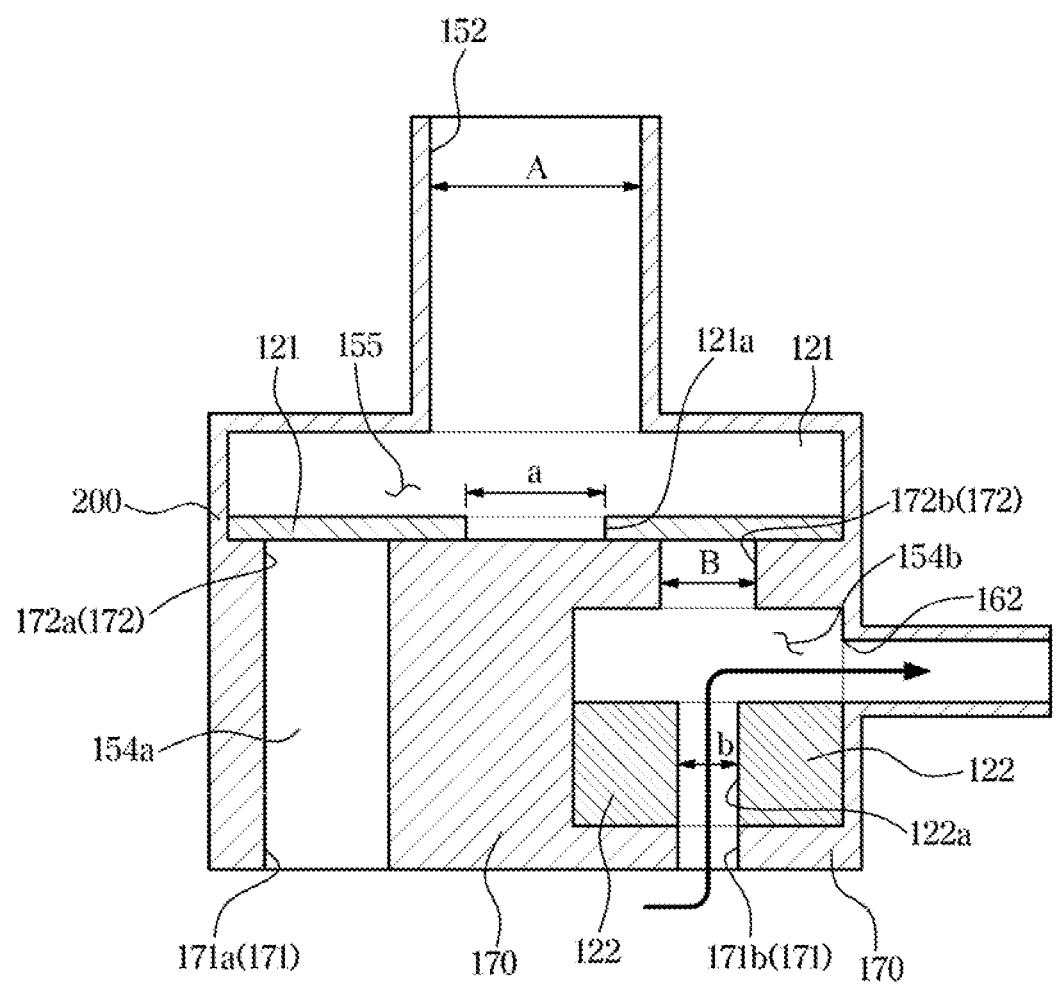
FIG. 11 is a schematic cross-sectional view of the valve when the compressor of FIG. 10 is stopped.

FIG. 10 is a schematic cross-sectional view of a valve during operation of a compressor, according to an embodiment of the disclosure. FIG. 11 is a schematic cross-sectional view of the valve when the compressor of FIG. 10 is stopped.

The same features as in the aforementioned embodiment are denoted by the same reference numerals, and the overlapping description will not be repeated.

Referring to FIGS. 10 and 11, the valve 100 may further include a fixed body 170. The fixed body 170 may be fixed in the valve case 200.

The fixed body 170 may include a plurality of fixed body inlets 171 and a plurality of fixed body outlets 172. The plurality of fixed body inlets 171 may include a first fixed body inlet 171a and a second fixed body inlet 171b. The fixed body inlet 171 may be the refrigerant inlet 151. The plurality of fixed body outlets 172 may include a first fixed body outlet 172a and a second fixed body outlet 172b. The refrigerant that has flowed in through the plurality of fixed body inlets 171 may flow out to the refrigerant outlet 152 through the plurality of fixed body outlets 172.

The first fixed body inlet 171a and outlet 172a are shown as being larger than the second fixed body inlet 171b and outlet 172b in FIG. 10. For example, the width of the second fixed body inlet 171b may correspond to the distance "b" in FIG. 10 and the width of the second fixed body outlet 172b is denoted by the distance "B" in FIG. 10. Thus, the second fixed body inlet 171b and the second fixed body outlet 172b may have different widths, with B being greater than b. For example, the width of the first fixed body inlet 171a and the width of the first fixed body outlet 172a may be the same as each other, and each may be greater than the distance B. However, the disclosure is not limited to these example widths. Furthermore, the fixed body inlet 171 and the fixed body outlet 172 may each be formed as singular inlet/outlet, respectively, rather than a plurality of inlets/outlets, respectively.

The floating body 120 may be provided as a plurality of floating bodies. For example, the plurality of floating bodies 120 may include a first floating body 121 and a second floating body 122.

The first floating body 121 may be arranged on the top of (above) the fixed body 170. In other words, the first floating body 121 may be arranged on the top of (above) the plurality of fixed body inlets 171. Accordingly, in an example the floating body 121 may also be provided as a plurality of floating bodies 121. The first floating body 121 may be located on the top of (above) the fixed body inlet 171 to open or block the main flow path 150. Accordingly, during operation of the compressor 10, the first floating body 121 may open the fixed body outlet 172, and when the compressor 10 is stopped, the first floating body 121 may block the fixed body outlet 172 to prevent refrigerant backflow. For example, the back-flowing refrigerant may pressurize the first floating body 121 so that the first floating body 121 is moved from the side of the condenser 20 to the side of (toward) the compressor 10. The first floating body 121 pressurized by the back-flowing refrigerant may move to the side of (toward) the fixed body outlet 172 to block the fixed body outlet 172. For example, the first floating body 121 may come into contact with an upper portion of the fixed body 170 so as to block the fixed body outlet 172.

The second floating body 122 may be arranged in a space in the fixed body 170. The second floating body 122 may be arranged in the fixed body 170 to open or block the bypass flow path 160. Accordingly, the second floating body 122 may open or block the bypass flow path 160. For example, the second floating body 122 may block the bypass outlet 162 during operation of the compressor 10 and may open the bypass outlet 162 when the compressor 10 is stopped. For example, the second floating body 122 may come into contact with a bottom portion of the fixed body 170 so as to open the bypass outlet 162. Accordingly, the internal space 14 may quickly reach a balanced pressure.

Each of the plurality of floating bodies 120 may include a hollow portion. That is, the first floating body 121 may include a first floating body hollow portion 121a, and the second floating body 122 may include a second floating body hollow portion 122a.

The first floating body hollow portion 121a may be formed to be smaller than the refrigerant outlet 152, and the second floating body hollow portion 122a may be formed to be smaller than the refrigerant inlet 151. As shown in FIG. 10, the refrigerant outlet 152 may have a width corresponding to a distance "A." The opening or first floating body hollow portion 121a provided in the first floating body 121 may have a width (e.g., a diameter) corresponding to a distance "a." For example, the distance "A" may be greater than the distance "a." As shown in FIG. 10, the opening or second floating body hollow portion 122a provided in the second floating body 122 may have a width (e.g., a diameter) corresponding to a distance "b." For example, the width of the second fixed body outlet 172b is denoted by the distance "B" in FIG. 10, and the distance "B" is greater than the distance "b."

In an embodiment of the disclosure, the fixed body inlet 171 may be the refrigerant inlet 151. For example, the first fixed body inlet 171a and the second fixed body inlet 171b may be the refrigerant inlet 151.

In an embodiment of the disclosure, the main flow path 150 includes the fixed body inlet 171, the fixed body outlet 172, a first branch flow path 154a, a second branch flow path 154b, and a merging flow path 155 and the refrigerant outlet 152 may be included. Referring to FIG. 10, the refrigerant flowing into the fixed body inlet 171 may pass through the first branch flow path 154a or the second branch flow path 154b and merge in the merging flow path 155. The refrigerant passing through the merging passage 155 may flow to the outside of the valve chamber 110 through the refrigerant outlet 152.

In an embodiment of the disclosure, the bypass flow path 160 may include the second fixed body inlet 171b, the second branch flow path 154b, and the bypass outlet 162. The second fixed body inlet 171b may be the bypass inlet 161. Referring to FIG. 11, the refrigerant flowing into the second fixed body inlet 171b may flow to the outside of the valve chamber 110 through the bypass outlet 162 through the second branch flow path 154b.

Figure 12:
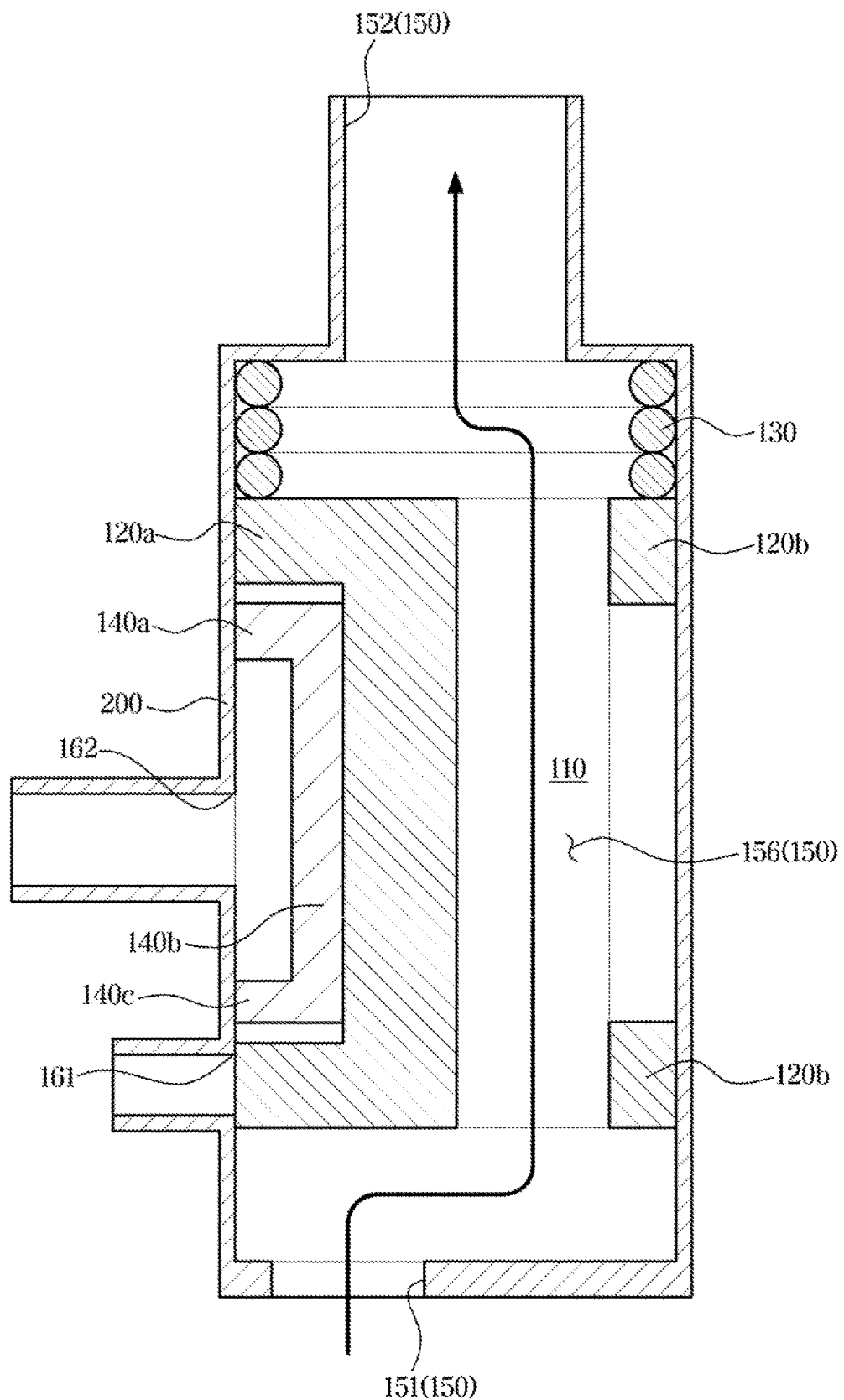
FIG. 12 is a schematic cross-sectional view of a valve during operation of a compressor, according to an embodiment of the disclosure.
Figure 13:
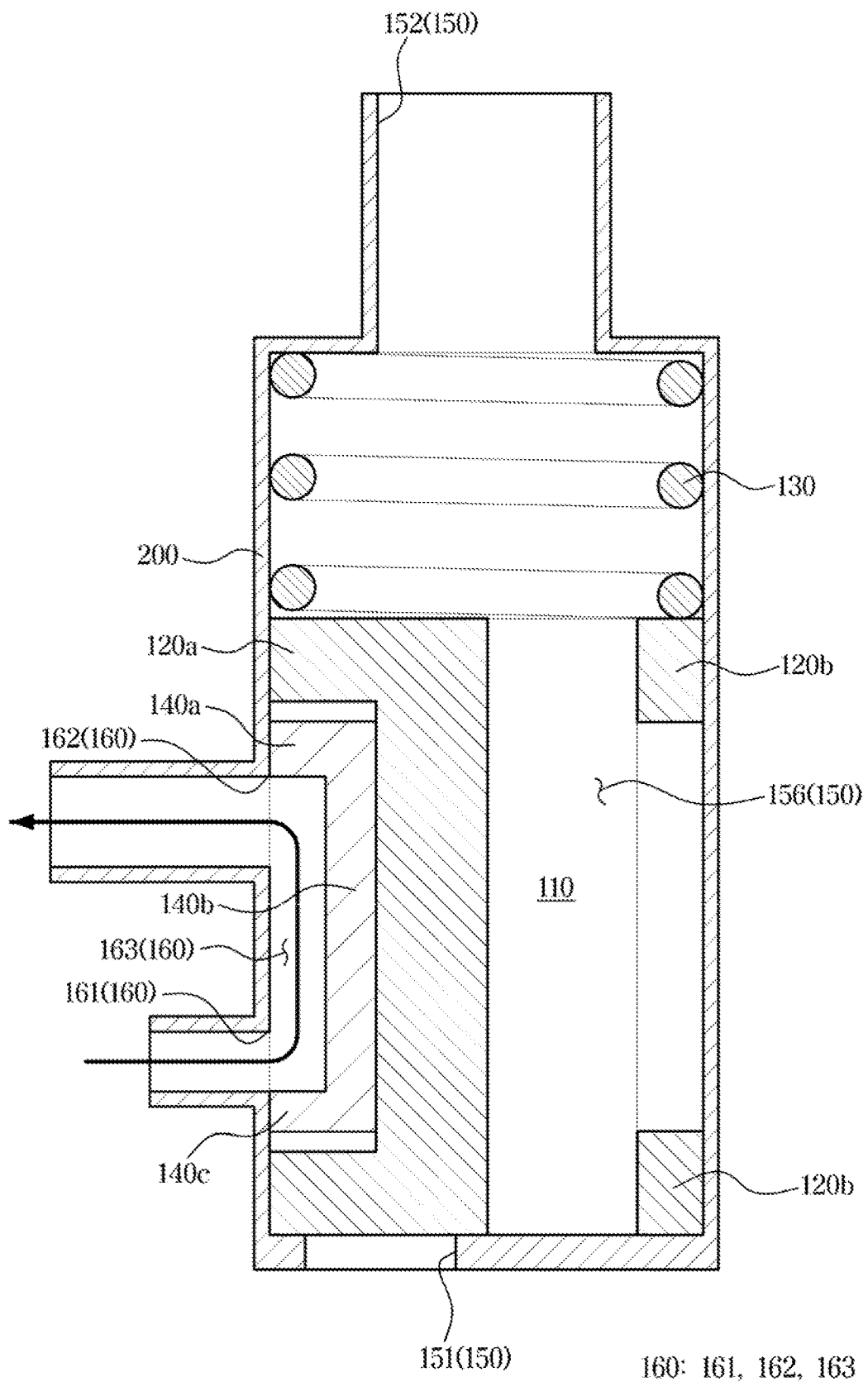
FIG. 13 is a schematic cross-sectional view of the valve when the compressor of FIG. 12 is stopped.

FIG. 12 is a schematic cross-sectional view of a valve during operation of a compressor, according to an embodiment of the disclosure. FIG. 13 is a schematic cross-sectional view of the valve when the compressor of FIG. 12 is stopped.

The same features as in the aforementioned embodiment are denoted by the same reference numerals, and the overlapping description will not be repeated.

Referring to FIGS. 12 to 13, the floating body 120 may include a plurality of bodies 120a and 120b. The plurality of bodies 120a and 120b may include a first body 120a and a second body 120b. The plurality of bodies 120a and 120b may be integrally formed. They are not, however, limited thereto, and may also be formed separately.

The first body 120a may be arranged on one side in the valve chamber 110, and the second body 120b may be arranged on the other side in the valve chamber 110. For example, where the valve chamber 110 is cylindrically shaped, the first body 120a may be disposed on one radial side of the valve chamber 110, and the second body 120b may be disposed on the other radial side of the valve chamber 110. The bypass flow path 160 may be formed between the first body 120a and a wall of the valve chamber 110. In other words, the bypass flow path 160 may be formed between the first body 120a and the valve case 200. It is not, however, limited thereto, and may also be formed between the second body 120b and the valve case 200. The first body 120a may open or block the refrigerant inlet 151. Accordingly, a flow of the refrigerant in the valve chamber 110 may be controlled by the first body 120a opening the refrigerant inlet 151 when the compressor 10 is operated and blocking the refrigerant inlet 151 when the compressor 10 is stopped. For example, the back-flowing refrigerant may pressurize the first body 120a so that the first body 120a is moved from the side of the condenser 20 to the side of (toward) the compressor 10. The first body 120a pressurized by the back-flowing refrigerant may move to the side of (toward) the refrigerant inlet 151 to block the refrigerant inlet 151.

As the first body 120a is moved down in the valve chamber 110, the first body 120a may open the bypass flow path 160. The first body 120a may open the bypass inlet 161 and the bypass outlet 162 so that the refrigerant in the compressor casing 11 may flow out of the casing 11 through the middle bypass flow path 163. In this case, the bypass inlet 161 may be connected to the inside of the casing 11, and the bypass outlet 162 may be connected to the outside of the casing 11. Although the connection may be made directly, the connection may also be made through an extra connection tube or the like.

The valve 100 may further include a sealing member 140. The sealing member 140 may include a plurality of sealing parts 140a, 140b, and 140c. The plurality of sealing parts 140a, 140b, and 140c may include a first sealing part 140a, a second sealing part 140b, and a third sealing part 140c. Of the plurality of sealing parts 140a, 140b and 140c, the first sealing part 140a may be arranged in an uppermost portion in the valve chamber 110. The second sealing part 140b may be connected to the first sealing part 140a and may extend vertically (e.g., in an axial direction of the valve chamber 110. The third sealing part 140c may be connected to the second sealing part 140b. Of the plurality of sealing parts 140a, 140b and 140c, the third sealing part 140c may be arranged in a lowermost portion in the valve chamber 110. The sealing member 140 may be arranged between the valve case 200 and the first body 120a. The sealing member 140 may be arranged in an area where the bypass flow path 160 is formed. In this way, the sealing member 140 may prevent the refrigerant from leaking out of the bypass flow path 160 when the compressor 10 is stopped. For example, the sealing member 140 may prevent the refrigerant from leaking into the main flow path 150 from the middle bypass flow path 163 when the compressor 10 is stopped.

The bypass inlet 161 may be arranged in a lower portion and the bypass outlet 162 may be arranged in an upper portion. The positions of the bypass inlet 161 and bypass outlet 162 are not, however, limited thereto.

Referring to FIG. 12, the refrigerant introduced into the valve chamber 110 through the refrigerant inlet 151 may pass through an internal flow path 156 formed inside the valve chamber 110 and through the refrigerant outlet 152 flow to the outside of the valve chamber 110.

Referring to FIG. 13, the refrigerant introduced into the valve chamber 110 through the bypass inlet 161 may pass through the middle bypass flow path 163 and flows out of the valve chamber 110 through the bypass outlet 162.

Figure 14:
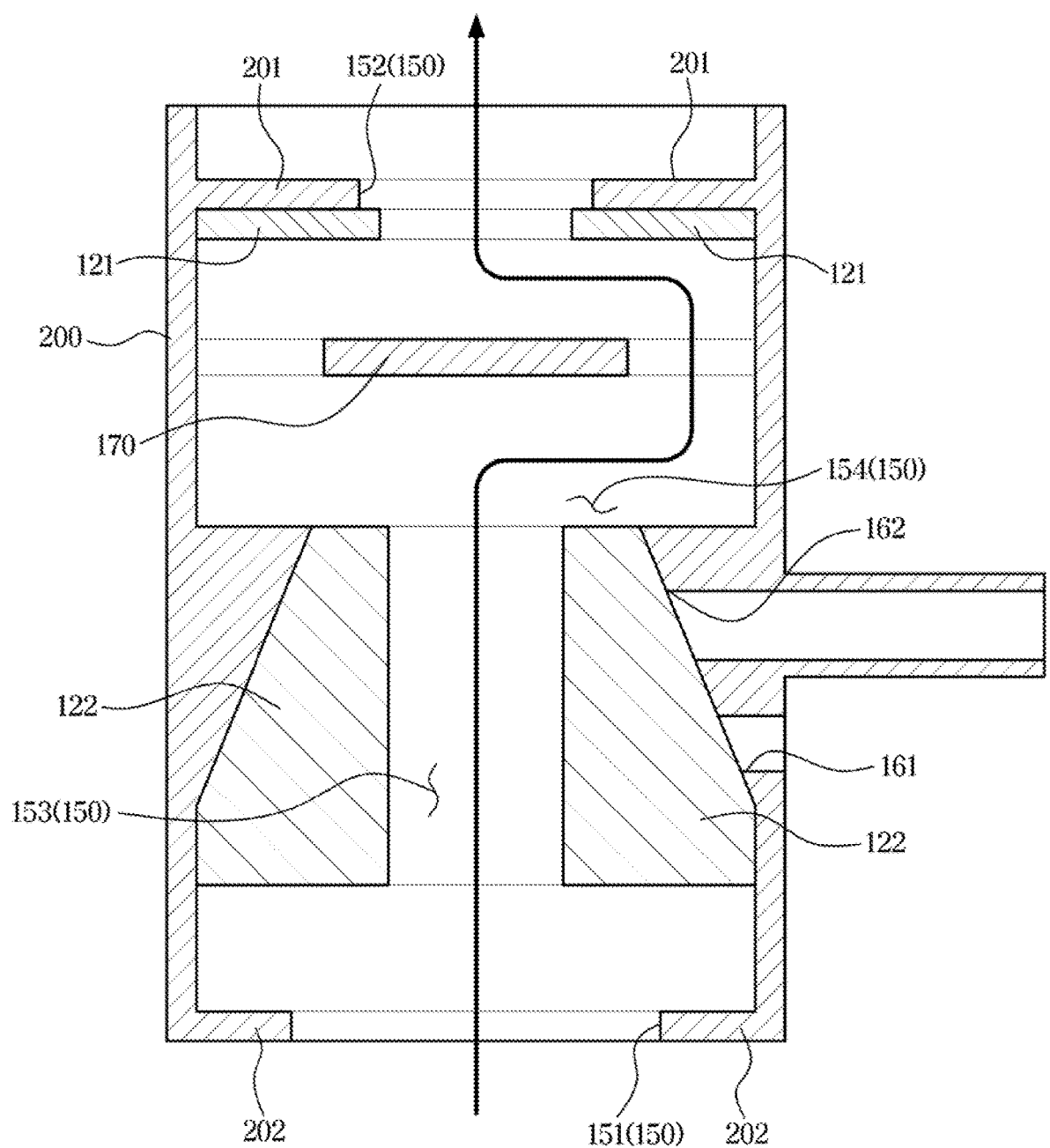
FIG. 14 is a schematic cross-sectional view of a valve during operation of a compressor, according to an embodiment of the disclosure.
Figure 15:
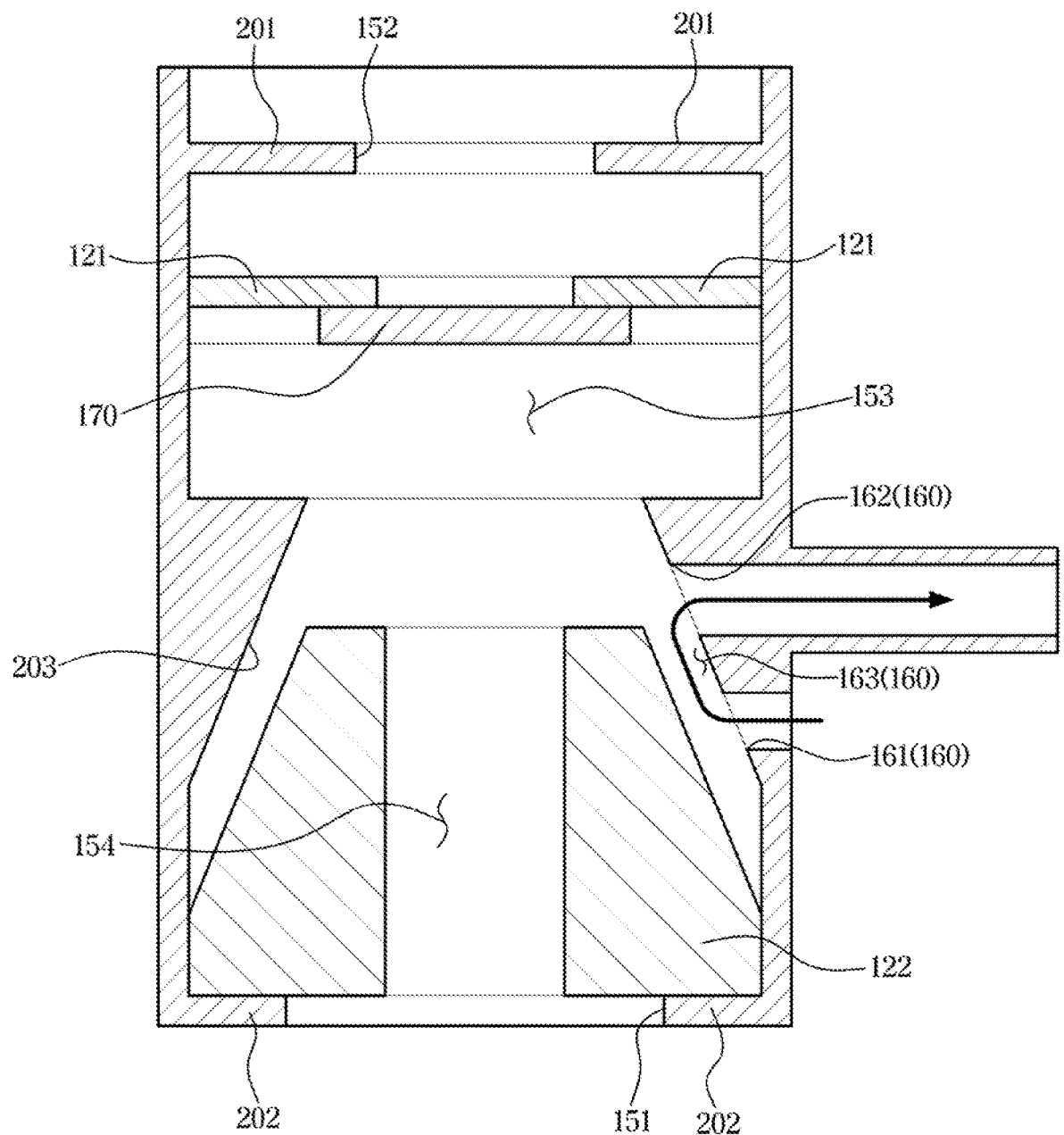
FIG. 15 is a schematic cross-sectional view of the valve while the compressor of FIG. 14 is stopped.

FIG. 14 is a schematic cross-sectional view of a valve during operation of a compressor, according to an embodiment of the disclosure. FIG. 15 is a schematic cross-sectional view of the valve when the compressor of FIG. 14 is stopped.

The same features as in the aforementioned embodiment are denoted by the same reference numerals, and the overlapping description will not be repeated.

Referring to FIGS. 14 and 15, the valve 100 may further include an upper guard wall 201, a lower guard wall 202, and a guide wall 203. For example, the valve case 200 may further include the upper guard wall 201, the lower guard wall 202, and the guide wall 203.

The upper guard wall 201 may be formed on the top of (above) the first floating body 121 to prevent the first floating body 121 from falling out of the valve case 200. The upper guard wall 201 may form the refrigerant outlet 152. For example, when the compressor 10 is stopped the back-flowing refrigerant may pressurize the first floating body 121 so that the first floating body 121 is moved from the side of the condenser 20 to the side of (toward) the compressor 10. The first floating body 121 pressurized by the back-flowing refrigerant may be moved downward (toward refrigerant inlet 151) in the valve chamber 110 to block the main flow path 150. For example, the first floating body 121 may move downward until the first floating body 121 comes into contact with an upper portion of fixed body 170 to block the main flow path 150.

The lower guard wall 202 may be formed underneath (below) the second floating body 122 to prevent the second floating body 122 from falling out of the valve case 200. The lower guard wall 202 may form the refrigerant inlet 151.

The guide wall 203 may be formed to be slanted upward to guide the second floating body 122 and the flow of the refrigerant. In the guide wall 203, the bypass inlet 161 and the bypass outlet 162 may be formed.

The second floating body 122 may be formed in a shape corresponding to the guide wall 203. That is, the second floating body 122 may be formed to be slanted upward. The second floating body 122 may open or block the bypass flow path 160. The second floating body 122 may open or block both the bypass inlet 161 and the bypass outlet 162. For example, as the second floating body 122 is moved down in the valve chamber 110, the second floating body 122 may open the bypass flow path 160. The second floating body 122 may open the bypass inlet 161 and the bypass outlet 162 so that the refrigerant in the compressor casing 11 may flow out of the casing 11 through the middle bypass flow path 163. In this case, the bypass inlet 161 may be connected to the inside of the casing 11, and the bypass outlet 162 may be connected to the outside of the casing 11. Although the connection may be made directly, the connection may also be made through an extra connection tube or the like.

Referring to FIG. 14, the refrigerant introduced through the refrigerant inlet 151 may pass through the first main passage 153, the second main passage 154, and the refrigerant outlet 152 in order to flow to the outside of the valve chamber 110. Referring to FIG. 15, the refrigerant introduced into the valve chamber 110 through the bypass inlet 161 may pass through the middle bypass flow path 163 and flows out of the valve chamber 110 through the bypass outlet 162.

Figure 16:
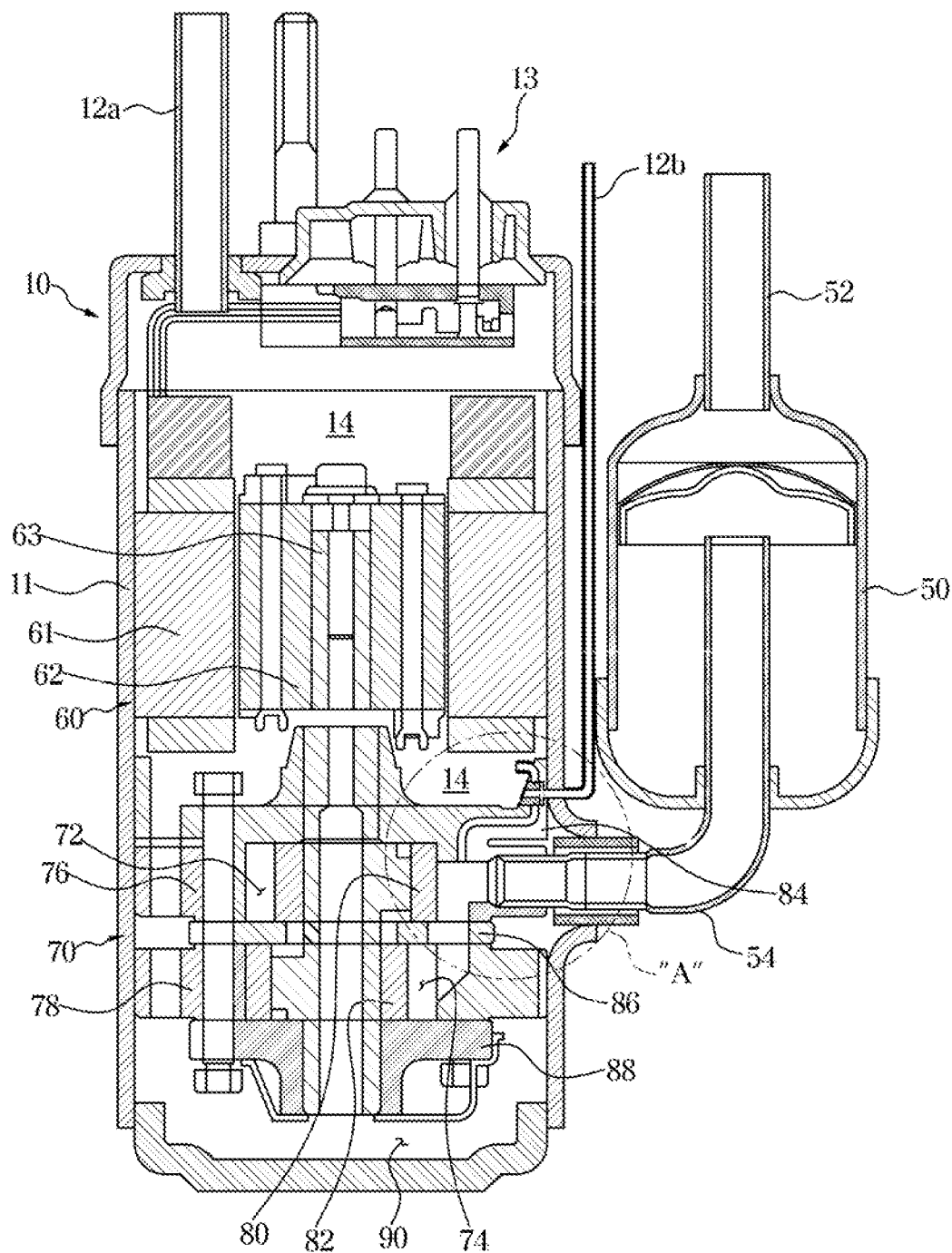
FIG. 16 is a cross-sectional view of a compressor, according to an embodiment of the disclosure.
Figure 17:
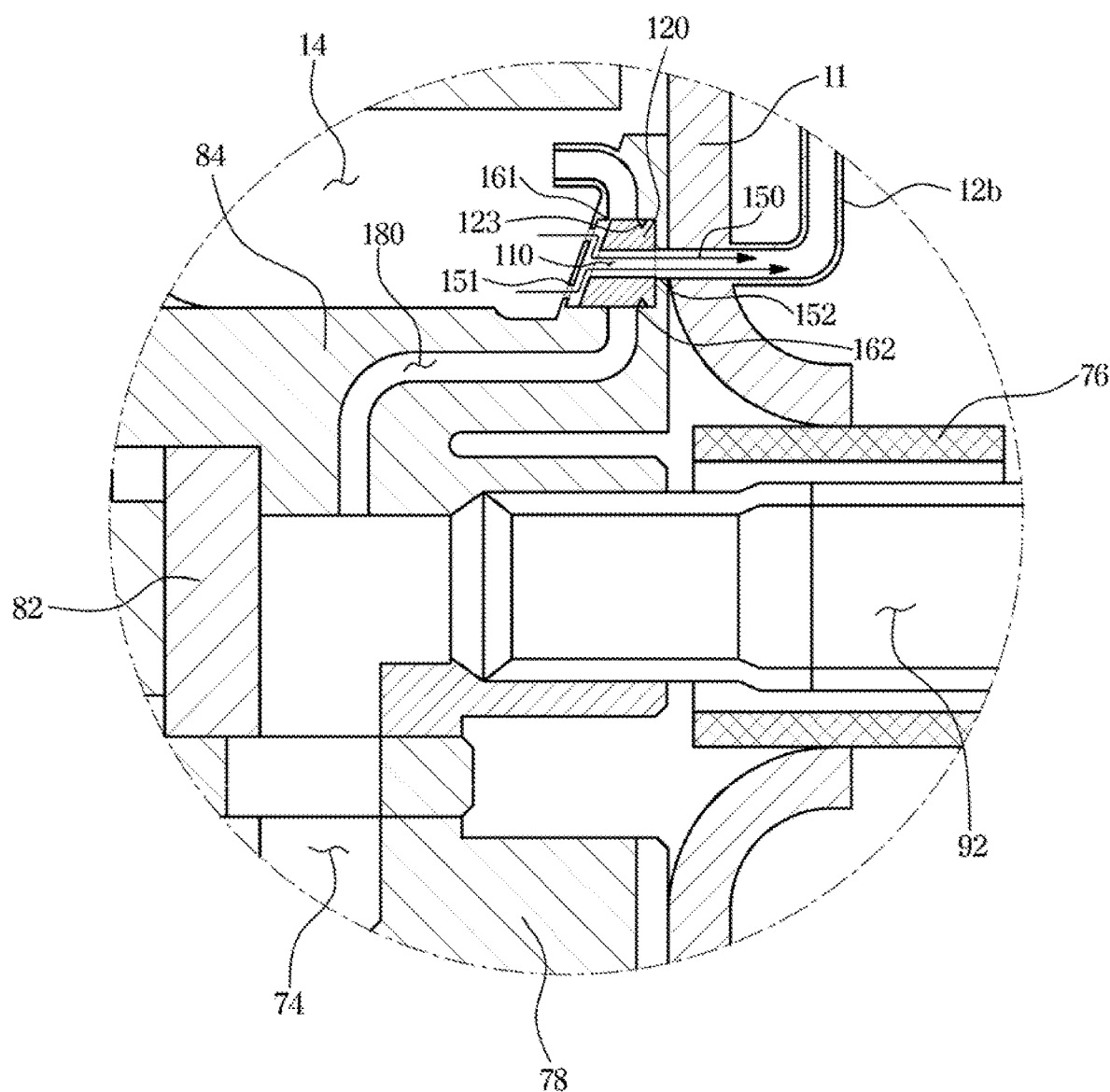
FIG. 17 is a schematic cross-sectional view of the valve during operation of the compressor of FIG. 16.
Figure 18:
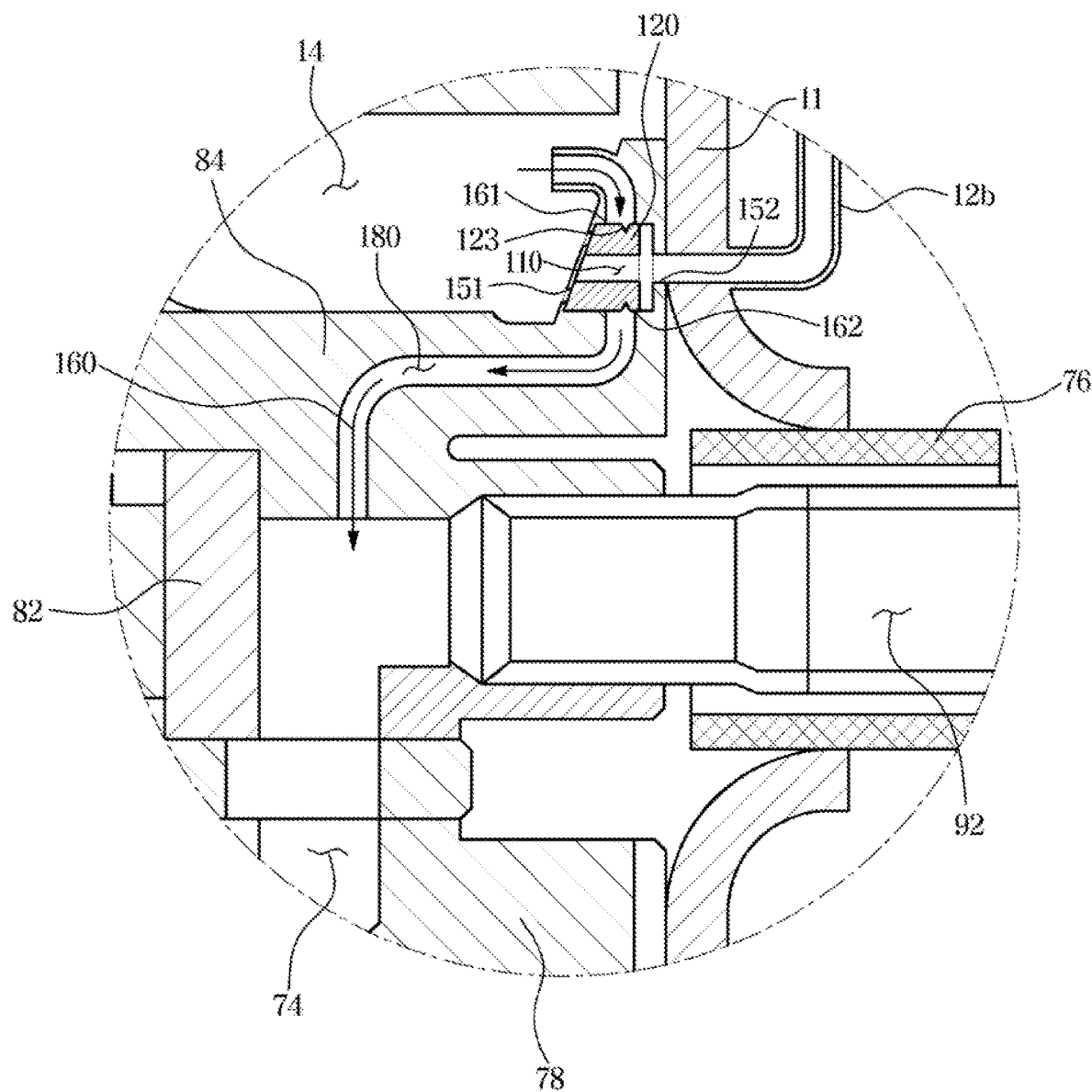
FIG. 18 is a schematic cross-sectional view of the valve when the compressor of FIG. 16 is stopped.

FIG. 16 is a cross-sectional view of a compressor, according to an embodiment of the disclosure. FIG. 17 is a schematic cross-sectional view of the valve during operation of the compressor of FIG. 16. FIG. 18 is a schematic cross-sectional view of the valve when the compressor of FIG. 16 is stopped.

The same features as in the aforementioned embodiment are denoted by the same reference numerals, and the overlapping description will not be repeated.

Referring to FIGS. 16 to 18, the discharge tube 12 may be provided as a plurality of discharge tubes. The plurality of discharge tubes may include a first discharge tube 12a and a second discharge tube 12b.

The high-pressure refrigerant present in the internal space 14 of the compressor may flow to the condenser through the first discharge tube 12a and the second discharge tube 12b.

The valve 100 may be formed in a plate. For example, the valve chamber 110 of the valve 100 may be formed without an extra case. Accordingly, material costs and production costs may be saved.

The compressor 10 may include the compression chambers 72 and 74 for compressing the refrigerant, and the refrigerant suction tube 54 for sucking the refrigerant into the compression chambers 72 and 74.

The valve 100 may be arranged between the internal space 14 and the refrigerant suction tube 54 so that the bypass flow path 160 discharges the refrigerant from the internal space 14 to the refrigerant suction tube 54.

As shown in FIG. 17, the floating body 120 of the compressor 10 may open the main flow path 150 during operation of the compressor 10. That is, the floating body 120 may open the refrigerant inlet 151 and the refrigerant outlet 152. In other words, during operation of the compressor 10, the refrigerant may flow into the valve through the refrigerant inlet 151 connected to the internal space 14 of the compressor 10. The refrigerant flowing in through the refrigerant inlet 151 may flow to the second discharge tube 12b through the valve chamber 110 and the refrigerant outlet 152. In this case, the bypass inlet 161 and the bypass outlet 162 may be blocked by the floating body 120.

As shown in FIG. 18, the floating body 120 may block the main flow path 150 when the compressor 10 is stopped. The floating body 120 may block the refrigerant inlet 151 and the refrigerant outlet 152. In this case, the floating body 120 may open the bypass flow path 160. For example, the floating body 120 may open the bypass inlet 161 and the bypass outlet 162. In other words, when the compressor 10 is stopped, the refrigerant flowing in through the bypass inlet 161 connected to the internal space 14 may pass through the valve chamber 110 and flow to a space connected to a suction port 92 through the bypass outlet 162 and the connection flow path 180. Accordingly, the internal space 14 and the compression chambers 72 and 74 may reach a balanced pressure in the same way as in FIG. 8.

Several example embodiments of the disclosure have been described above, but a person of ordinary skill in the art will understand and appreciate that various modifications can be made without departing from the scope of the disclosure. Thus, it will be apparent to those or ordinary skill in the art that the scope of technical protection is defined by the following claims.

What is claimed is:

1. A compressor, comprising:
a casing;
a driving unit disposed in the casing;
a compression unit, coupled to the driving unit, configured to compress a refrigerant; and
a valve configured to control a flow of the refrigerant in the casing, wherein the valve includes:
a valve chamber including a main flow path, in which the refrigerant is to flow, the main flow path including a refrigerant inlet and a refrigerant outlet,
a floating body disposed in the valve chamber and including a flow path connecting between the refrigerant inlet and the refrigerant outlet, the floating body configured to be movable by the refrigerant passing through the flow path so as to open the main flow path when a pressure at the refrigerant inlet is greater than a pressure at the refrigerant outlet, and to close the main flow path when the pressure at the refrigerant inlet is not greater than the pressure at the refrigerant outlet, and
a bypass flow path, formed in the valve chamber, and configured to be opened by the floating body when the floating body is moved to close the main flow path to thereby allow the refrigerant to be detoured to the bypass flow path, and to be closed by the floating body when the floating body is moved to open the main flow path.

2. The compressor of claim 1, wherein
when the driving unit is operated, the pressure at the refrigerant inlet is greater than the pressure at the refrigerant outlet, and the floating body is moved to open the main flow path, and
when the driving unit is stopped, the pressure at the refrigerant outlet is not greater than the pressure at the refrigerant outlet, and the floating body is moved to close the main flow path and open the bypass flow path.

3. The compressor of claim 2, wherein
the bypass flow path includes a bypass inlet and a bypass outlet,
when the driving unit is operated, the floating body is configured to close at least one of the bypass inlet and the bypass outlet.

4. The compressor of claim 2, wherein the valve further includes an elastic member configured to pressure the floating body toward the refrigerant inlet.

5. The compressor of claim 4, further comprising:
a sealing member disposed between the valve chamber and the floating body to prevent the refrigerant from leaking into the bypass flow path during an operation of the driving unit.

6. The compressor of claim 5, wherein
the refrigerant inlet is formed at a lower portion of the valve chamber and the refrigerant outlet is formed at an upper portion of the valve chamber,
the elastic member is disposed between the upper portion of the valve chamber and the floating body, and
the bypass flow path is disposed along a circumferential surface of the floating body.

7. The compressor of claim 1, wherein
the floating body includes a plurality of floating bodies, and
the plurality of floating bodies include a first floating body disposed in an upper portion of the valve chamber and a second floating body disposed below the first floating body.

8. The compressor of claim 7, wherein
the valve further includes a fixed body disposed in the valve chamber, to allow the refrigerant to flow along the main flow path or the bypass flow path,
the first floating body is disposed above the fixed body to open or close the main flow path, and
the second floating body is disposed in an internal space of the fixed body to open or close the bypass flow path.

9. The compressor of claim 8, wherein
the plurality of floating bodies each include a hollow portion,
the first floating body includes a first floating body hollow portion formed to be smaller than the refrigerant outlet, and
the second floating body includes a second floating body hollow portion formed to be smaller than an inlet of the fixed body.

10. The compressor of claim 4, wherein
the floating body includes a first floating body disposed on a first side of the valve chamber and a second floating body disposed on a second side of the valve chamber,
the bypass flow path is formed between the valve chamber and at least one of the first floating body and the floating second body, and
the compressor further comprises a sealing member disposed in an area where the bypass flow path is formed to prevent the refrigerant from leaking from the bypass flow path when the driving unit is stopped.

11. The compressor of claim 1, further comprising:
a refrigerant suction tube configured to suck the refrigerant into the compression unit,
wherein the valve is disposed between an internal space of the casing and the refrigerant suction tube so that the bypass flow path discharges the refrigerant from the internal space of the casing into the refrigerant suction tube.

12. The compressor of claim 5, wherein the sealing member includes polytetrafluoroethylene.

13. A refrigeration cycle device, comprising:
a condenser;
an expander connected to the condenser;
an evaporator connected to the expander;
a compressor connected to the evaporator and configured to compress a refrigerant; and
a valve, disposed on at least one of an outside or an inside of the compressor, configured to control a flow of the refrigerant in the compressor, wherein the valve includes:
a valve chamber including a refrigerant inlet and a refrigerant outlet,
a floating body, disposed in the valve chamber and including a flow path connecting between the refrigerant inlet and the refrigerant outlet, and configured to be movable to control a flow of the refrigerant into the valve chamber and a flow of the refrigerant out of the valve chamber, and
a bypass flow path, formed in the valve chamber, and configured to be opened or closed based on a movement of the floating body,
wherein the floating body is movable by the refrigerant passing through the flow path to open the refrigerant inlet and close the bypass flow path so that the refrigerant flows into the refrigerant inlet and out of the refrigerant outlet when a pressure at the refrigerant inlet is greater than a pressure at the refrigerant outlet, and
the floating body is movable to close the refrigerant inlet and open the bypass flow path so that the refrigerant is detoured through the bypass flow path when the pressure at the refrigerant inlet is not greater than the pressure at the refrigerant outlet.

14. The refrigeration cycle device of claim 13, wherein the floating body is configured to close the bypass flow path when the compressor is operated, and to open the bypass flow path when the compressor is stopped.

15. The refrigeration cycle device of claim 14, wherein the valve further includes:
a main flow path formed in the valve chamber and through which the refrigerant is flowable from the refrigerant inlet to the refrigerant outlet, and
an elastic member configured to pressure the floating body toward the refrigerant inlet, the elastic member being disposed between the valve chamber and the floating body.

* * * * *